US009879620B2

United States Patent
Makkapati et al.

(10) Patent No.: US 9,879,620 B2
(45) Date of Patent: Jan. 30, 2018

(54) VACUUM CONTROL VIA A COMPRESSOR BYPASS VALVE IN A TWIN-COMPRESSOR ENGINE SYSTEM

(71) Applicant: Ford Global Technologies, LLC, Dearborn, MI (US)

(72) Inventors: Satheesh Makkapati, Canton, MI (US); Dushyant Karthikeyan, Dearborn, MI (US); Julia Helen Buckland, Commerce Township, MI (US); Eric Warren Curtis, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 14/937,245

(22) Filed: Nov. 10, 2015

(65) Prior Publication Data
US 2017/0130658 A1   May 11, 2017

(51) Int. Cl.
| | |
|---|---|
| *F02B 37/04* | (2006.01) |
| *F02D 41/00* | (2006.01) |
| *F02B 33/44* | (2006.01) |
| *F02B 37/013* | (2006.01) |
| *F02B 37/10* | (2006.01) |
| *F02B 37/12* | (2006.01) |
| *F02B 37/16* | (2006.01) |
| *F02B 37/18* | (2006.01) |

(Continued)

(52) U.S. Cl.
CPC .......... *F02D 41/0007* (2013.01); *F02B 33/44* (2013.01); *F02B 37/013* (2013.01); *F02B 37/04* (2013.01); *F02B 37/10* (2013.01); *F02B 37/127* (2013.01); *F02B 37/16* (2013.01); *F02B 37/18* (2013.01); *F02B 39/04* (2013.01); *F02B 39/10* (2013.01); *F02B 2037/122* (2013.01); *F02B 2037/162* (2013.01); *F02D 2200/0406* (2013.01); *Y02T 10/144* (2013.01)

(58) Field of Classification Search
CPC ...... F02B 37/127; F02B 37/16; F02B 37/162; F02B 37/164; F02B 37/18; F02B 37/004; F02B 37/013; F02B 37/10; F02B 2037/162; F02B 33/44; F02D 41/0007
USPC ............ 123/562; 60/600, 602, 612; 701/103
See application file for complete search history.

(56) References Cited

U.S. PATENT DOCUMENTS

| | | | | |
|---|---|---|---|---|
| 4,430,064 | A | * | 2/1984 | Lamarche ........... F16F 15/1202 192/201 |
| 4,936,167 | A | * | 6/1990 | Mehta ................. F16H 61/0213 477/143 |

(Continued)

*Primary Examiner* — Hai Huynh
*Assistant Examiner* — Gonzalo Laguarda
(74) *Attorney, Agent, or Firm* — Julia Voutyras; McCoy Russell LLP

(57) ABSTRACT

Methods and systems are provided for reducing vacuum at an outlet of an upstream first compressor when powering on a second compressor positioned downstream of the first compressor. In one example, a method may comprise, in response to a desired engine torque increasing above a threshold: powering on a second compressor positioned downstream of a first compressor in an intake of an engine system, and opening a compressor recirculation valve (CRV) positioned in a bypass passage coupled across the first compressor for a duration. As such, a portion of intake gasses from upstream of the first compressor may be routed to the second compressor.

16 Claims, 6 Drawing Sheets

(51) Int. Cl.
F02B 39/04 (2006.01)
F02B 39/10 (2006.01)

(56) References Cited

U.S. PATENT DOCUMENTS 5,027,934 A * 7/1991 Benford .............. F16H 63/3026
192/48.61
2013/0170948 A1 7/2013 Horner et al.
2014/0305413 A1 10/2014 Ahms

* cited by examiner

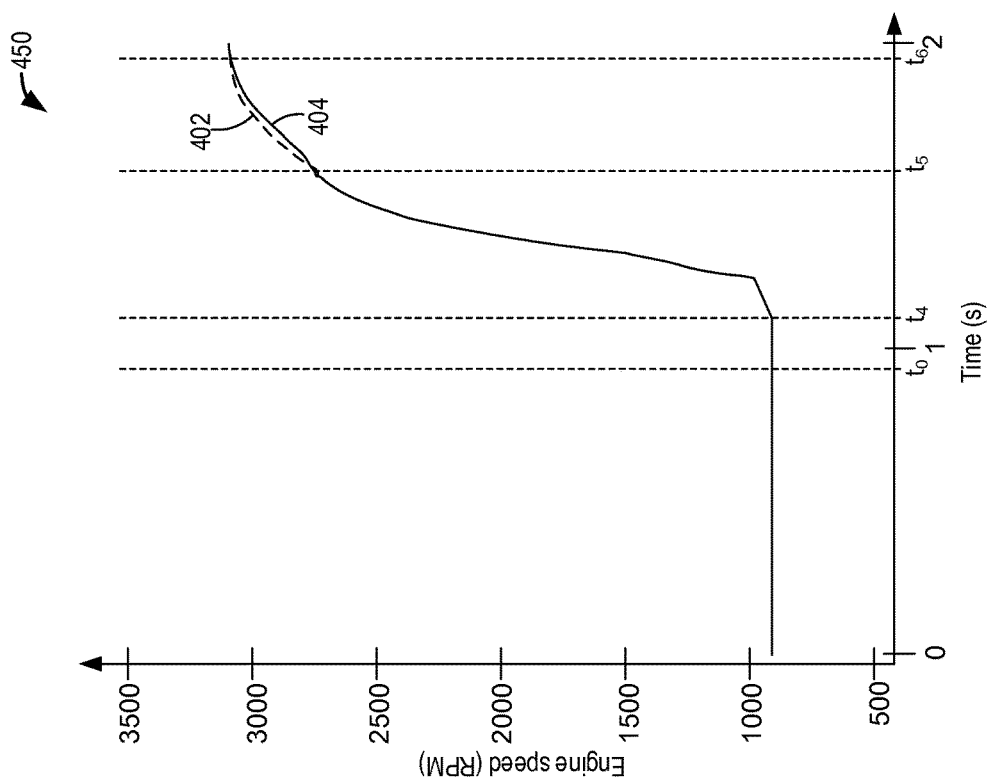
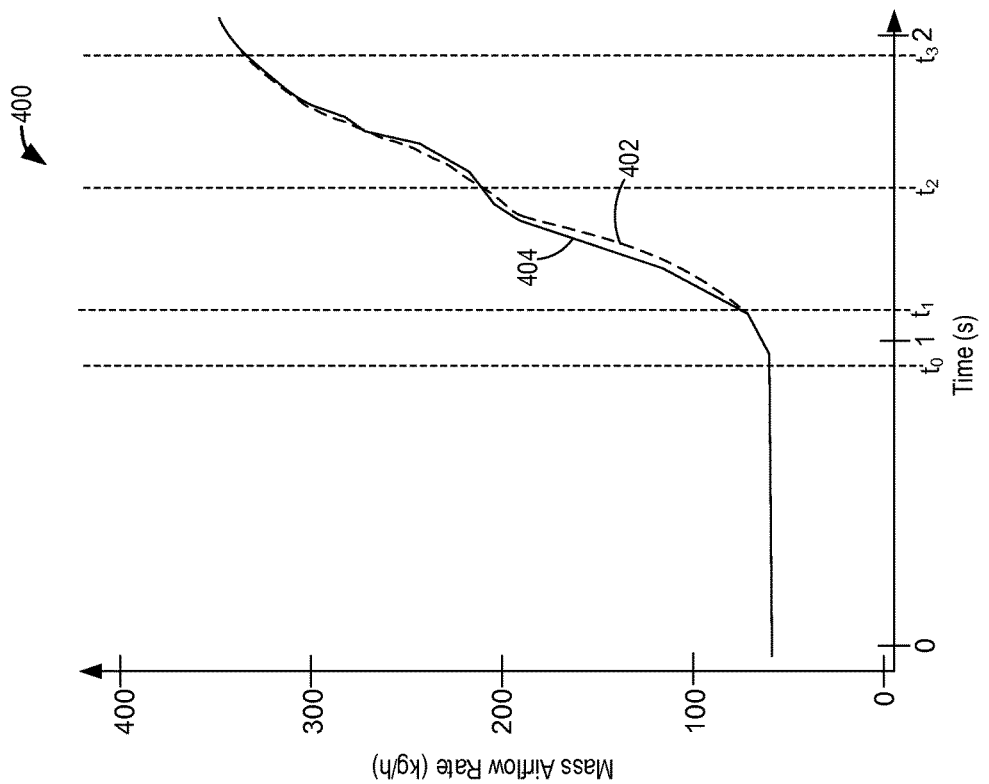
FIG. 4B
FIG. 4A

VACUUM CONTROL VIA A COMPRESSOR BYPASS VALVE IN A TWIN-COMPRESSOR ENGINE SYSTEM

FIELD

The present description relates generally to systems and methods for regulating boost pressure in an engine intake system including two or more compressors.

BACKGROUND/SUMMARY

Turbocharged engines utilize a turbocharger to compress intake air and increase the power output of the engine. A turbocharger may use an exhaust-driven turbine to drive a compressor which compresses intake air. As the speed of the compressor increases, increased boost is provided to the engine. Upon receiving an increased torque demand, it may take an amount of time for the turbine and compressor to speed up and provide the required boost. This delay in turbocharger response, termed turbo lag, may result in a delay in providing the demanded engine power.

Some attempts to address turbo lag and engine torque response delays include positioning a second compressor in series with the compressor of the turbocharger in the engine intake. In one example, the second compressor may be an electric assist compressor, and may provide extra boost to intake air while the compressor of the turbocharger speeds up. Another system to reduce engine torque response delays includes utilizing a dual turbocharger arrangement in which two turbochargers are arranged in series along the induction path.

However, the inventors herein have recognized potential issues with such systems that include two compressors in series along the induction passage. For example, the downstream compressor when turned on, may create a vacuum in the intake volume between the two compressors. Specifically, the downstream compressor may speed up more quickly than the first compressor, and as a result a vacuum may be produced between the upstream and downstream compressors. Thus, the pressure at an outlet of the upstream compressor may become so reduced due to the suction generated by the downstream compressor, that the pressure at an inlet of the upstream compressor (e.g., barometric pressure) may actually exceed the pressure at the outlet. Thus, a negative pressure differential may develop across the upstream compressor, which may lead to oil leakage through seals of the compressor, resulting in degradation of the compressor.

In one example, the issues described above may be addressed by a method comprising, in response to a desired engine torque increasing above a threshold: powering on a second compressor positioned downstream of a first compressor in an intake of an engine system, and opening a compressor recirculation valve (CRV) positioned in a bypass passage coupled across the first compressor for a duration, and routing a portion of intake gasses from upstream of the first compressor to the second compressor. In this way, by opening the CRV and providing a source of air to the second compressor from upstream of the first compressor, an amount of vacuum generated at an outlet of the first compressor by the second compressor may be reduced. Specifically, by opening the CRV, the second compressor may draw in air from upstream of the first compressor, thereby reducing an amount of air drawn from the outlet of the first compressor.

In some examples, the CRV may be maintained in an open position until a speed of the first compressor reaches a first threshold speed, where the first threshold speed corresponds to a speed of the first compressor sufficient to generate a pressure greater than barometric pressure at an outlet of the first compressor, with the second compressor powered on. Thus, by keeping the CRV open until the first compressor has reached the threshold speed, the pressure at the outlet of the first compressor may be maintained above a pressure at an inlet of the first compressor.

It yet further examples, a boost assist valve positioned in a passage coupled across the second compressor may be opened in response to a pressure in the intake downstream of the second compressor increasing above a pressure in a volume of the intake included upstream of the second compressor and downstream of the first compressor. Thus, by opening the boost assist valve when the second compressor is powered on, intake gasses compressed by the second compressor may be recirculated to upstream of the compressor, in a volume of the intake included between the first and second compressors. In this way, the pressure in the volume of the intake include between the first and second compressor may be increased, and as such vacuum at the outlet of the first compressor may be reduced. Thus, oil leakage across seals of the first compressor may be reduced.

In another representation, a method may comprise, in response to a tip-in from a vehicle operator: opening a compressor bypass valve positioned in a passage coupled across a first compressor, powering on a second compressor positioned downstream of the first compressor in an intake of an engine system, and closing the compressor bypass valve in response to a pressure at an outlet of the first compressor increasing above a threshold pressure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4A shows a graph depicting how mass airflow rates in an engine intake may be affected by either opening or closing a compressor recirculation valve in response to a desired engine torque increasing above a threshold.

FIG. 4B shows a graph depicting how engine speeds may be affected by either opening or closing a compressor recirculation valve in response to a desired engine torque increasing above a threshold.

DETAILED DESCRIPTION

The following description relates to systems and methods for regulating air pressure in a volume of an engine intake system included between two compressors of the engine intake. An engine system, such as the example engine system shown in FIGS. 1A and 1B, may include two compressors in the intake for boosting the pressure of air provided to one or more engine cylinders. The two compressors may in some examples be positioned in series with one another, such that intake air must flow through a first compressor positioned upstream of a second compressor before flowing through the second compressor. In response to a tip-in event from a vehicle operator via an accelerator pedal, both of the compressors may be turned on to increase the pressure and therefore mass airflow of air provided to the engine cylinders. However, due to the suction generated by the downstream second compressor, a negative pressure differential may be created across the first compressor, where the pressure at an outlet of the first compressor may be less than at an inlet of the first compressor. Due to the negative pressure differential generated across the first compressor, oil may leak through seals of the first compressor, leading to degradation of the first compressor.

A compressor bypass valve (CBV) or compressor recirculation valve (CRV) positioned in a bypass passage coupled across the first compressor may be opened to reduce and/or prevent vacuum (e.g., pressure below barometric pressure) at the outlet of the first compressor. Specifically, in response to an engine torque demand increasing above a threshold, an engine controller may execute a method, such as the example methods shown in FIGS. 2-3, which may include opening the CRV for a duration when powering on and/or running the second compressor. By opening the CRV when powering on the second compressor, an amount of decrease in the pressure at the outlet of the first compressor may be reduced. As such, the pressure at the outlet of the first compressor may be maintained at a higher pressure than the inlet, and oil leakage and therefore compressor degradation may be reduced. Further, as shown in the graphs presented in FIGS. 4A and 4B, engine speeds and mass airflow rates may be relatively unaffected by opening the CRV when powering on the second compressor. Thus, opening the CRV may reduce vacuum level at the outlet of the first compressor, without sacrificing engine speed losses, or reductions in mass airflow rates.

Figure 1A:
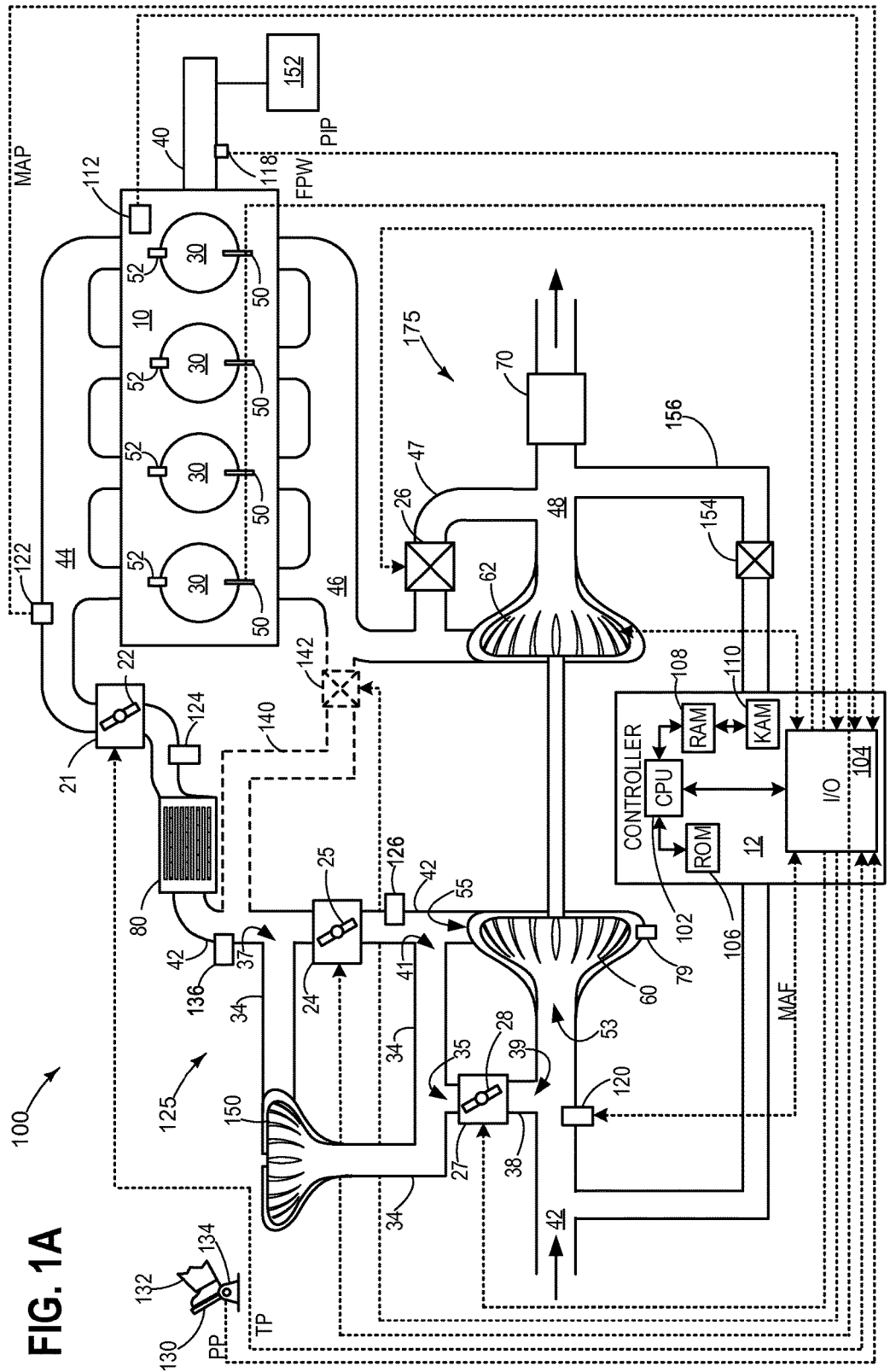
FIG. 1A shows a schematic diagram of a first embodiment of an example engine system including two compressors for compressing intake air provided to one or more engine cylinders.
Figure 1B:
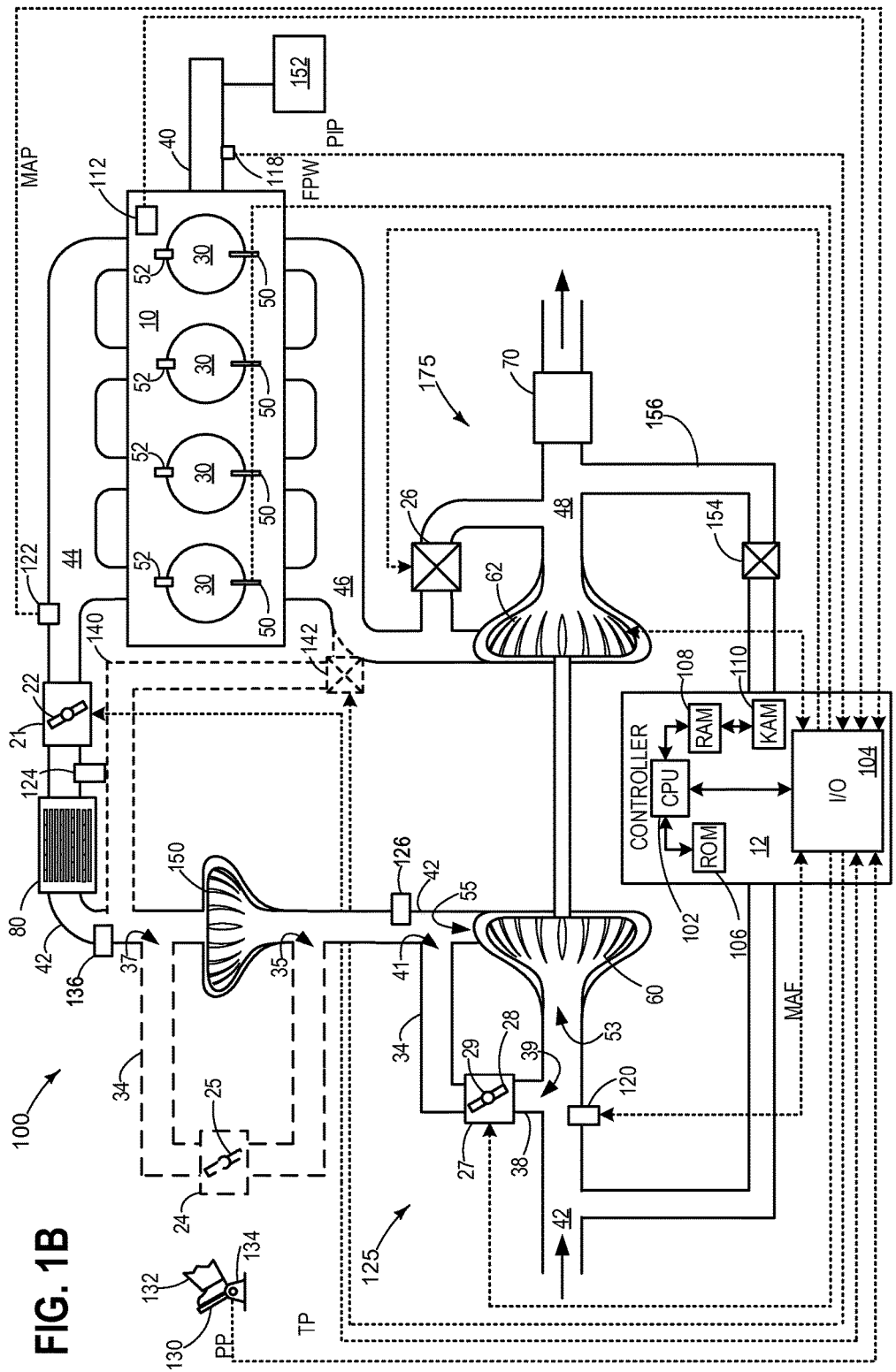
FIG. 1B shows a schematic diagram of a second embodiment of an example engine system including two compressors for compressing intake air provided to one or more engine cylinders.

FIG. 1A and FIG. 1B are schematic diagrams showing an example engine system 100, including an engine 10, engine intake 125, and engine exhaust 175. Specifically, FIGS. 1A and 1B show different example configurations for positioning two compressors within the engine intake 125. As such, FIGS. 1A and 1B may be discussed together in the description herein. Components introduced in the description of FIG. 1A may not be reintroduced or discussed again in the description of FIG. 1B. Focusing now on FIG. 1A, engine system 100 is shown, which may be included in a propulsion system of an on-road vehicle. The engine 10 is shown with four cylinders or combustion chambers 30. However, other numbers of cylinders may be used in accordance with the current disclosure.

Engine system 100 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Based on inputs received from the vehicle operator 132 via the input device 130, a desired engine torque may be determined by the controller 12. The controller 12 may then send signals to one or more engine actuators to adjust engine operation so that the desired engine torque may be achieved. For example, and as described in greater detail below, the controller 12 may send signals to one or more throttles (e.g., first throttle 21, and second throttle 21 shown in FIG. 1) to adjust a mass airflow rate to the combustion chambers 30, and to one or more fuel injectors (e.g., fuel injectors 50 shown in FIG. 1) to adjust a fuel injection amount to the combustion chambers 30 to achieve the desired engine torque. Further, the controller 12 may additionally adjust one or more a spark ignition timing, alternator torque, compressor speed, etc., to achieve the desired engine torque. For example, to achieve the mass airflow rate sufficient to deliver the desired engine torque, the controller 12 may increase the speed of one or more compressors so that the pressure of air (and therefore an amount of air), delivered to the combustion chambers 30 may be increased.

The engine system 100 includes the engine intake 125 for providing air to the combustion chambers 30, and the engine exhaust 175 for exhausting and/or purifying the products of combustion (e.g., exhaust gasses) from the combustion chambers 30 to the atmosphere. Specifically, the engine intake 125 may include a first compressor 60 and a second compressor 150 for compressing intake air provided to the combustion chambers 30. Further, the engine intake 125 may include one or more passages for flowing air to the combustion chambers 30 (e.g., intake passage 42, boost passage 34, intake manifold 44, etc.), one or more throttles for regulating airflow through the passages in the intake 125, and one or more sensors for measuring and/or estimating the pressure (e.g., boost pressure sensor 126) and/or temperature (e.g., temperature sensor 124) of air in the intake passages. It should be appreciated that the engine intake 125 may include other components in addition to the ones mentioned above. Components of the engine intake 125 will be described in greater detail below following a description of the engine 10.

The engine exhaust 175 may include a turbine 162 for powering one or more of first compressor 60 and the second compressor 150, an exhaust gas recirculation (EGR) system for routing a portion of exhaust gasses in the engine exhaust 175 back to the engine intake 125, and an emission control device 70 for reducing hydrocarbon, NOx, and/or other emissions to the atmosphere. The atmosphere includes the ambient environment surrounding the engine system 100, which may have an ambient temperature and pressure (such as barometric pressure). It should be appreciated that the engine exhaust 175 may include other components in addition to the ones mentioned above. Components of the engine exhaust 175 will be described in greater detail below following the description of the engine 10.

Continuing now with the description of the engine 10, each of the combustion chambers (e.g., cylinders) 30 of the engine 10, may include combustion chamber walls with a piston (not shown) positioned therein. The pistons may be coupled to a crankshaft 40 so that reciprocating motion of the pistons is translated into rotational motion of the crankshaft 40. The crankshaft 40 may be coupled to at least one drive wheel of a vehicle and use engine output torque to propel the vehicle.

The crankshaft 40 may also be used to drive an alternator 152. Specifically, rotational mechanical energy from the crankshaft 40 may be converted into electrical energy by the alternator 152. The alternator 152 may be used to charge and/or power various components in the engine system 100, such as the second compressor 150. In a preferred embodiment, second compressor 150 may be comprise a supercharger, and as such, may be powered by the engine 10. Specifically, the crankshaft 40 may be used to provide power to the second compressor 150 via a direct mechanical linkage between the crankshaft 40 and the compressor 150. The mechanical linkage may include any suitable device, such as a belt, chain, gear, clutch mechanism, etc., for coupling the crankshaft 40 to the compressor 150, and transferring rotational energy from the crankshaft 40 to the compressor 150. Thus, in some examples, the second compressor 150 may receive mechanical power output by the engine 10.

However, in alternate examples, the second compressor 150 may be an electric compressor and may be powered using stored electrical charge or power from the alternator 152. As such, the controller 12 may adjust operation of the second compressor 150 by adjusting an amount of electrical power supplied to the second compressor 150 from the alternator 152 and/or a supercapacitor (not shown), electrically coupled to the alternator 152 for storing electrical charge/energy produced by the alternator 152.

Although in the preferred embodiment, the second compressor 150 may comprise and/or may be included in a supercharger, it should also be appreciated that in other embodiments, the second compressor 150 may comprise a turbocharger. Thus, the second compressor 150 may in some examples, by powered by an exhaust-driven turbine (e.g., turbine 62 shown in FIG. 1) via a mechanical coupling between the compressor 150 and the turbine.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chambers 30 via respective intake valves and exhaust valves (not shown). In some embodiments, each of the combustion chambers 30 may include two or more intake valves and/or two or more exhaust valves.

Fuel injectors 50 are shown coupled directly to the combustion chambers 30 for injecting fuel directly therein in proportion to the pulse width of signal FPW received from controller 12. In this manner, the fuel injectors 50 provide what is known as direct injection of fuel into the combustion chambers 30; however it will be appreciated that port injection is also possible. Fuel may be delivered to the fuel injectors 50 by a fuel system (not shown) including a fuel tank, a fuel pump, and a fuel rail.

In a process referred to as ignition, the injected fuel is ignited by known ignition means such as spark plug 52, resulting in combustion. Thus, each of the combustion chambers 30 may include a spark plug 52. Each spark plug 52 may provide an electric spark that initiates combustion of the air/fuel mixture in each of the respective combustion chambers 30. The time at which the spark plug 52 provides the electric spark to initiate combustion may be referred to as the spark ignition timing. Specifically, spark ignition timing may be the point during the piston stroke at which the spark plug 52 provides the electric spark. Spark ignition timing may be controlled by the controller 12. In some examples, the spark ignition timing may be controlled such that the spark provided by the spark plug 52 occurs before (advanced) or after (retarded) the manufacturer's specified time. For example, spark timing may be retarded from maximum break torque (MBT) timing to control engine knock or advanced under high humidity conditions. MBT timing may refer to a spark ignition timing that occurs during the compression stroke (in a four-stroke engine) of the piston, before the piston has reached top dead center (TDC). The spark ignition timing may be adjusted to a position later in the compression stroke of the piston relative to MBT when retarding the spark ignition timing. Conversely, the spark ignition timing may be adjusted to a position earlier in the compression stroke of the piston relative to MBT when advancing the spark ignition timing.

The engine cylinders 30 may receive intake air from the engine intake 125. Specifically, the engine intake 125 may include one or more of intake passage 42, boost passage 34, and intake manifold 44, through which intake air may flow en route to the engine cylinders 30. The intake manifold 44 may be in fluidic communication with the engine cylinders 30 via one or more intake valves, and may therefore route intake air received from the intake passage 42, to the engine cylinders 30. Air may be supplied to the intake manifold 44 by intake passage 42. As such, intake passage 42 may fluidically connect the intake manifold 44 to the atmosphere. In this way, intake air may flow first through the intake passage 42, and then through the intake manifold 44, before reaching the engine cylinders 30.

A first compressor 60 may be positioned in the intake passage 42, upstream of the second compressor 150 for compressing intake air supplied to the intake manifold 44. However, it should be appreciated that in other examples, the first compressor 60 may be positioned downstream of the second compressor 150. In yet further examples, the first compressor 60 and second compressor 150 may be positioned in parallel with one another in the intake 125.

In a preferred embodiment, compressor 60 may be an exhaust-driven turbocharger compressor, and as such may be included in, and/or may comprise, a turbocharger. Thus, intake manifold 44 may receive compressed air (e.g., air at a higher pressure than barometric pressure) from an outlet of the compressor 60. In this way, intake air drawn into the engine system 100 through the intake passage 42 may be compressed by the compressor 60, and then directed through the intake passage 42 downstream of the compressor 60 to the intake manifold 44. In the description herein, boost, may be used to refer to an amount that the intake air is compressed between the intake passage 42 upstream of the compressor 60, and the intake manifold 44. Thus, the boost level may relate to an amount that intake air is compressed relative to barometric pressure (BP). Boost pressure, or boost level of air downstream of the compressor 60, may depend on a speed of the compressor 60.

As shown in the example of FIG. 1, the first compressor 60 may be at least partially driven by turbine 62, via, for example, a shaft, belt, chain, gear, or other coupling arrangement. Thus, in a preferred embodiment, the first compressor 60, may be included in, and/or may comprise, a turbocharger. The turbine 62 may be arranged along the exhaust passage 48. Exhaust gasses flowing through the exhaust passage 48 may spin the turbine 62. Rotational energy from the turbine 62 may then be used to power the compressor 60 via a mechanical linkage between the turbine 62 and the compressor 60. Thus, the driving motion of the turbine 62 may drive the first compressor 60. As such, the speed of the first compressor 60 may be based on the speed of the turbine 62. As the speed of the turbine 62 increases, the speed of the first compressor 60 may increase, and an amount of boost provided to the flow passage 32 may increase.

In some examples, a speed sensor 79 may be coupled to the first compressor 60 for measuring and/or estimating a speed of the first compressor 60. As such, the speed sensor 79 may be a Hall effect sensor, or any other suitable type of sensor for measuring the rotational speed of the first compressor 60. As such, the controller 12 may be in electrical communication with the speed sensor 79, and as such may receive an indication of the speed of the first compressor 60 via signals received from the speed sensor 79.

Boost pressure provided by the first compressor 60 may be regulated by a wastegate valve 26. Specifically, the speed of the turbine 62, and therefore the speed of the first compressor 60 may be regulated by adjusting an amount of exhaust gasses flowing through the turbine 62 via the wastegate valve 26. As such, an amount of boost in the engine intake 125 may be regulated by adjusting the position of the wastegate valve 26. Wastegate valve 26 may be included in a turbine bypass passage 47, coupled across the turbine 62, for diverting exhaust gas away from the turbine 62. Thus, the wastegate 26 may be opened to provide a path for exhaust gasses to flow to bypass the turbine 62. Specifically, turbine bypass passage 47 may be coupled on one end to the exhaust passage 48, upstream of the turbine 62, and on an opposite second end to the exhaust passage 48, downstream of the turbine 62. Wastegate valve 26 may be positioned in the turbine bypass passage 47 for regulating flow there-through. By regulating an amount of gas flow through the bypass passage 47, wastegate valve 26 therefore may regulate gas flow through the turbine 62.

Specifically, by increasing an opening formed by the wastegate valve 26, an amount of exhaust gasses flowing through the bypass passage 47 may be increased, and an amount of exhaust gasses flowing through the turbine 62 may correspondingly be reduced. As such, a speed of the turbine 62, and therefore a speed of the compressor 60 may be reduced. Thus, opening the wastegate valve 26 (e.g., adjusting to a more open position), may reduce an amount of boost provided by the compressor 60. In response to a boost level in the engine intake 125 increasing above a desired boost level, the controller 12 may send signals to the wastegate valve 26 to open, so that an amount of boost in the engine intake 125 may be reduced. Thus, the controller 12, may adjust the position of the wastegate valve 26 to match the boost level in the intake 125 to the desired boost level. As described above, the desired boost level may be determined based on the desired torque level, where the desired boost level may correspond to an intake manifold pressure sufficient to deliver the desired torque level as commanded by the vehicle operator 132. In this, way, the wastegate valve 26 may be adjusted to reduce an amount of boost pressure in the intake 125, so that the boost pressure does not exceed the desired boost level. The wastegate valve 26 therefore, may be a normally closed valve that may be opened in response to engine operating conditions where boost in the engine intake 125 exceeds the desired boost level.

Conversely, adjusting the position of the wastegate valve 26 to a more closed position may reduce the amount of exhaust gasses flowing through the bypass passage 47, and correspondingly increase the amount of exhaust gasses flowing through the turbine 62. As such, a speed of the turbine 62, and therefore a speed of the compressor 60 may be increased. Thus, closing the wastegate valve 26 (e.g., adjusting to a more closed position), may increase an amount of boost provided by the compressor 60. In this way, an amount of boost provided to the intake air by the compressor 60 may be adjusted by adjusting the position of the wastegate valve 26.

In some examples, the wastegate valve 26 may additionally be opened in response to engine operating conditions where boost is not desired. Specifically, the wastegate valve 26 may be opened in response to engine operating conditions where it is not desired to increase the pressure of intake air above barometric pressure (BP). For example, when the desired engine torque decreases below a threshold, where the desired engine torque may be delivered without compressing ambient air above BP, boost may not be desired. Said another way, when the desired engine torque decreases below the threshold, the desired engine torque may be achieved without boosting the air via the compressor 60. Thus, the wastegate valve 26 may be opened when the desired engine torque decreases below a threshold. Since the turbine 62 may be more restrictive to exhaust gas flow than the bypass passage 47 when the wastegate valve 26 is open, the wastegate valve 26 may be opened to provide a less flow restrictive path for exhaust gasses to exit the engine system 100. Thus, when boost is not desired, the wastegate valve 26 may be opened so that impedance to the flow of exhaust gasses through the exhaust passage 48 may be reduced. As such, backpressure exerted on the engine 10 by the exhaust gasses may be reduced, and therefore fuel efficiency may be increased.

Although the first compressor 60 is described in the preferred embodiment to be an exhaust-driven turbocharger, it should be appreciated that in other embodiments, the compressor 60 may be driven by the engine and/or an electric motor. Thus, in some examples, the first compressor 60, may be included in, and/or may comprise, a supercharger, and may be powered via mechanical output from the crankshaft 40, and/or electrical energy from the alternator 152, as described above for the second compressor 150. Thus, the amount of compression provided to one or more cylinders of the engine via an electrically driven compressor may be varied by the controller 12.

The engine intake 125 further includes second compressor 150 which may be positioned downstream of the first compressor 60. Specifically, the second compressor 150 may be positioned in a boost passage 34, the boost passage 34 coupled to the intake passage 42 downstream of the first compressor 60. As shown in the example of FIG. 1A, the boost passage 34 may be coupled across a first throttle 24, where the first throttle 24 may be positioned in the intake passage 42 downstream of the first compressor 60. Specifically, a first end 35 of the boost passage 34 may be coupled to the intake passage 42 downstream of the compressor 60, and upstream of the first throttle 24. A second end 37 of the of the boost passage 34 may be coupled to the intake passage 42 downstream of the first throttle 24. In the example shown in FIG. 1A, the second end 37 of the boost passage 34 may be coupled to the intake passage 42 downstream of the first throttle 24, and upstream of a charge air cooler 80. However, in other examples, it should be appreciated that the second end 37 of the boost passage 34 may be coupled to the flow passage 32 downstream of the charge air cooler 80.

However, it should be appreciated that in other embodiments, as shown below with reference to FIG. 1B, the positioning of the throttle 24 and compressor 150 may be reversed, so that the throttle 24 is instead positioned in the boost passage 34, and the compressor 150 is positioned in the intake passage 42 between the first end 35 and second end 37 of the boost passage 34, where the boost passage 34 is coupled to the intake passage 42.

In this way, the throttle 24 may be positioned in a passage coupled across the compressor 150, so that flow through the compressor 150 may be regulated by the throttle 24. Said another way, the position of the throttle 24 may be adjusted to regulate an amount of boost provided by the compressor 150. Thus, the throttle 24 may serve as a bypass valve for the second compressor 150, where air flowing to the intake manifold 44 from downstream of the compressor 60, may be diverted around the second compressor 150 by opening of the throttle 24. In some examples, when the pressure between the first compressor 60 and the second compressor 150 and throttle 24 is lower than downstream of the throttle 24 and compressor 150, air may flow from downstream of the throttle 24, to upstream of the throttle 24 upon opening of the throttle 24. In this way, the throttle 24, may be opened to reduce an amount of boost downstream of the second compressor 150.

First throttle 24 may include a throttle plate 25, where the throttle plate 25 may be adjustable by an actuator based on signals received from the controller 12. In this way, the controller 12 may send signals to an actuator of the throttle plate 25, to adjust the position of the throttle plate 25 to regulate airflow through the intake passage 42. Specifically, airflow through the intake passage 42 may be increased by adjusting the throttle plate 25 to a more open position where an opening formed by the throttle plate 25 is increased. Opening the throttle 24 may reduce an amount of boost provided by compressor 150. Specifically by opening the throttle 24, air compressed by the compressor 150, may be allowed to recirculate to intake passage 42, upstream of the compressor 150. Similarly, airflow through the intake passage 42 may be decreased by adjusting the throttle plate 25 to a more closed position where the opening formed by the throttle plate 25 decreases. The controller 12 therefore, may adjust airflow through the intake passage 42 by sending signals to an actuator of the throttle plate 25 to adjust the position of the throttle plate 25. Thus, when the boost pressure downstream of the second compressor 150 is less than desired and the compressor 150 is spinning, the throttle 24 may be adjusted to a closed position, so that substantially all intake air flowing to the intake manifold 44, must flow through the second compressor 150 before reaching the intake manifold 44.

In examples where boost passage 34 is coupled across the first throttle 24, as shown in the example of FIG. 1A, flow through the boost passage 34 may be regulated by the first throttle 24. Thus, the position of the first throttle 24 may be adjusted to regulate airflow through the boost passage 34. Said another way, the position of the first throttle 24 in the intake passage 42, may affect an amount of air flowing through the boost passage 34. Specifically, as the first throttle 24 is adjusted towards a more closed position, airflow through the first throttle 24 may decrease, and thus airflow through the boost passage 34 may increase. In this way, the first throttle 24 may be configured as a boost assist valve, which regulates an amount of air flowing to and/or supplied to the second compressor 150. By closing the first throttle 24, airflow to the compressor 150 may be increased. In some examples, the first throttle 24 may be adjusted to a fully closed position, which may substantially block all airflow through the throttle 24, and thus in some examples, intake passage 42. Thus, when the throttle is adjusted to the fully closed position, substantially all intake air upstream of the first throttle 24 may be forced through the second compressor 150 and boost passage 34, before rejoining the intake passage 42, downstream of the first throttle 24. Conversely, as the first throttle 24 is adjusted towards a more open position, airflow through the first throttle 24 may increase, and airflow through the boost passage 34 may decrease.

Further, airflow through the compressor 150 and/or boost passage 34 may depend on the speed of the second compressor 150. As described above, the speed of the second compressor 150 may be adjusted by the controller 12, by adjusting an amount of electrical power supplied to the second compressor 150 from the alternator 152 and/or a supercapacitor. Second compressor 150 may be operated to increase boost pressure of air upstream of the compressor 150 in one or more of the boost passage 34 and intake passage 42. In some examples, compressor 150 may provide additional boost to intake air already compressed by the first compressor 60. Thus, in response to a desired torque level increasing above a threshold, the compressor 150 may be turned on to provide added boost to intake air flowing to the intake manifold 44. As power to the second compressor 150 is increased, the speed of the compressor 150 may increase, and an amount of air flowing through the compressor 150 and/or boost passage 34 may increase. Thus, as the second compressor 150 spins, air upstream of the compressor 150 may be drawn through the compressor 150. When the compressor 150 is off, and the compressor 150 is not spinning, airflow through the compressor 150 and/or boost passage 34 may be reduced relative to when the compressor 150 is on and spinning. In some examples, airflow through the compressor 150 and/or boost passage 34 may be substantially zero when the compressor 150 is off and not spinning. However, in other examples, airflow through the compressor 150 and/or boost passage 34 may be greater than zero when the compressor 150 is off and not spinning.

In this way, one or more of the position of the first throttle 24, and the speed of the compressor 150 may affect an amount of air flowing through the compressor 150 and/or the boost passage 34. Specifically, increases in the speed of the second compressor 150, and/or decreases in the opening formed by the throttle plate 25 may increase the amount of air flowing through the compressor 150 and/or boost passage 34. Thus, an amount of boost provided by the compressor 150 when the compressor is on may be adjusted by adjusting the position of the first throttle 24. In one example, the throttle 24 may be opened in response to a boost pressure downstream of the compressor 150 increasing above a desired boost level, so that air compressed by the compressor 150 may be recirculated to upstream of the compressor 150 in one or more of intake passage 42 and boost passage 34. As such, if the boost pressure downstream of the compressor 150 increases above the desired boost level, the throttle 24 may be opened to reduce boost pressure downstream of the compressor 150. Further, when the compressor 150 is off, the throttle may be opened so that intake air may flow around the compressor 150 en route to the intake manifold 44.

A first boost pressure sensor 136 may be positioned in the intake passage 42 downstream of the compressor 150, and thus downstream of where the second end 37 of the boost passage 34 is coupled to the intake passage 42. In this way, boost pressure sensor 136 may be configured to measure a pressure and therefore an amount of boost of air compressed by compressor 150 and/or compressor 60. Specifically, outputs received from the pressure sensor 136, may be used by the controller 12 to estimate boost levels in the intake passage 42 downstream of the first and second compressors 60 and 150, respectively.

Further, a compressor bypass valve (CBV) or compressor recirculation valve (CRV) 27 may be included in a compressor bypass conduit 38, where the compressor bypass conduit 38 may couple the intake passage 42 to one or more of the boost passage 34 and intake passage 42 downstream of the compressor. Specifically, the compressor bypass conduit 38 may be coupled at a first end 39 to the intake passage 42 upstream of the first compressor 60, and at a second end 41 to the boost passage 34 upstream of the second compressor 150. The CRV 27 may include a throttle plate 28, where the position of the throttle plate 28 may be adjusted by an actuator 29 of the throttle plate 28 in response to signals received from the controller 12. Thus, the controller 12 may adjust a position of the throttle plate 28 to regulate an amount of air flowing through the compressor bypass conduit 38.

The actuator 29 may an electromagnetic actuator that may adjust (e.g., rotate) the position of the throttle plate 28. In some examples, the CRV 27 may be a binary valve and may be adjusted between a fully open position and a fully closed position. However, in other examples, the CRV 27 may be a continuously variable valve, and the position of the CRV 27 may therefore be adjusted to the fully open position and/or the fully closed position, and/or any position between the fully open and fully closed positions.

Although the compressor bypass conduit 38 is shown in the example of FIG. 1A to be coupled on the second end 41 to the boost passage 34, it should also be appreciated that in other embodiments, the second end 41 of the boost passage 34 may be coupled to the intake passage 42 downstream of the compressor 60, and upstream of where the first end 35 of the boost passage 34 is coupled to the intake passage 42. However, in both examples, where compressor bypass conduit 38 is coupled to either the boost passage 34 or to the intake passage 42 downstream of the compressor 60, intake air must flow through one or more of the CRV 27 and compressor 60, before flowing through compressor 150 and first throttle 24. Thus, intake air flows first through one or more of the CRV 27 and compressor 60, and then through one or more of throttle 24 and compressor 150, before reaching the intake manifold 44.

As described above with reference to operation of the throttle plate 25 and throttle 24, flow through the CRV 27 may be increased by adjusting the throttle plate 28 to a more open position where an opening formed by the throttle plate 28 increases. In some examples, increasing an opening of the CRV may include adjusting the throttle plate 28 to a fully open position. In another example, increasing an opening of the CRV 27 may include opening the CRV 27 if the CRV 27 is closed. Further, closing the CRV 27 and/or decreasing an opening of the CRV may include adjusting the throttle plate 28 to a more closed position where an opening formed by the throttle plate 28 decreases. In some examples, closing of the CRV 27 may include adjusting the throttle plate 28 to a fully closed position where substantially no air may flow through the CRV 27 and bypass passage 38.

The CRV 27, may be opened to divert intake air around the first compressor 60, and therefore regulate an amount of boost provided by the compressor 60. Flow through the bypass passage 38 and CRV 27 may depend on the pressure differential across the CRV 27. For example, if the compressor 60 has been running, and boost pressure in the intake passage 42 downstream of the compressor 60 is higher than BP, compressed air may flow from one or more of the intake passage 42 downstream of the compressor 60, and boost passage 34, to the intake passage 42, upstream of the compressor 60, upon opening of the CRV 27. Thus, the CRV 27 may be opened if the boost pressure downstream of the compressor 60 is greater than a desired boost pressure sufficient to achieve the desired engine torque.

In this way, the CRV 27 may be opened to reduce boost pressure in the intake passage 42, downstream of the first compressor 60. Thus, opening the CRV 27 may allow boosted intake air from downstream of the first compressor 60, to recirculate to upstream of the compressor 60. In this way, boost pressure downstream of the first compressor 60 may be reduced by opening the CRV 27. As such, compressor surge may be reduced and/or prevented by opening the CRV 27. Specifically, the CRV 27 may be opened when one or more of a boost pressure downstream of the first compressor 60 increases above the desired boost level, and/or the desired engine torque decreases below a threshold, such as during a tip-out where vehicle operator 132 may release the input device 130 to a more released foot position.

Therefore, the positions of both the CRV 27, and the wastegate valve 26 may be adjusted to regulate boost pressure in the engine intake 125. Specifically, the CRV 27, and/or the wastegate valve 26 may be adjusted to more open positions to reduce an amount of boost pressure provided to intake air by the first compressor 60. Therefore, the wastegate 26 and/or the CRV 27 may be adjusted by the controller 12 to a more open positions when the boost pressure of intake air downstream of the compressor 60 exceeds the desired boost level, and a lower boost pressure is desired, for example.

However, in other examples, if the pressure in the intake passage 42 downstream of the compressor 60, and/or boost passage 34 is less than BP, air may flow from the intake passage 42 upstream of the compressor 60, to one or more of the boost passage 34 and intake passage 42 downstream of the compressor 60 upon opening of the CRV 27. In some examples therefore, the CRV 27 may be opened when boost is not desired and/or the speed of the compressor 60 is sufficiently slow such that flow through the compressor 60 would be more restricted than flow through the bypass passage 38 with the CRV 27 open.

As described in greater detail below with reference to FIG. 2 the pressure of air in the intake passage 42 downstream of the compressor 60 and upstream of the throttle 24, and/or in the boost passage 34, upstream of the compressor 150, may decrease when the compressor 150 is turned on and/or is running Said another way, pressure in the volume of the intake 125 included between the compressor 60 and the compressor 150 may decrease when the compressor 150 is turned on and/or is running. The compressor 150 may be turned on in response to the desired torque increasing above a threshold. Specifically, the controller 12 may increase an amount of electrical power supplied to the compressor 150 by the alternator 152 in response to the desired torque increasing above a threshold.

When the compressor 150 is powered on, the pressure of air in the intake 125 between the first compressor 60 and second compressor 150 may decrease as the speed of the compressor 150 increases and more air from downstream of the compressor 60 is sucked into the compressor 150 during a power-on sequence. Specifically, the compressor 150 may generate suction at an inlet of the compressor 150 as it spins, and that suction may draw in air from upstream of the compressor 150. Since the compressor 150 may be positioned downstream of the compressor 60, the compressor 150 may generate suction which may result in pressure losses between the two compressors 60 and 150, and vacuum may be generated at an outlet 55 of the first compressor 60. Specifically, in some examples, the mass airflow rate through the second compressor 150 may be greater than the mass airflow rate through the first compressor 60, and as such, the pressure in the volume of the intake 125 included between the two compressors 60 and 150 may decrease. In some examples, the pressure in the intake passage 42 downstream of the compressor 60, between the compressor 60 and the throttle 24 may decrease below BP while the compressor 150 is on and spinning. Thus, due to increases in the speed of compressor 150, the pressure at the outlet 55 of the compressor 60, where compressed air exits the compressor 60, may be lower than the pressure upstream of the compressor 60 at an inlet 53 of the compressor 60, where air enters the compressor 60, from the intake passage 42. In such examples, where a negative pressure differential exists across the compressor 60, such that the pressure at the outlet 55 of the compressor 60 is lower than at the inlet 53 of compressor 60, oil may leak through seals of the compressor 60, leading to degradation of the compressor 60.

Thus, as explained in greater detail below with reference to FIG. 3, the CRV 27 may be opened for a threshold duration during the start-up of the compressor 150 to reduce oil leakage past the seals of the compressor 60. Specifically, the CRV may be opened for a duration when turning on the second compressor 150 in response to the desired engine torque increasing above a threshold, such as from a tip-in from the vehicle operator 132. Additionally or alternatively, the CRV 27 may be opened during engine operating conditions where the pressure at the outlet 55 of the compressor 60 and/or in the volume of the intake 125 between the compressor 60 and compressor 150 is less than a threshold (e.g., barometric pressure). Specifically, a pressure sensor 126 may be positioned in the intake passage 42, downstream of the compressor 60 and upstream of the throttle 24 and compressor 150, where outputs from the pressure sensor 126 may be used to estimate a pressure of air in the intake 125, upstream of the throttle 24 and compressor 150, and downstream of the compressor 60. Based on outputs from the pressure sensor 126, the controller 12 may send signals to the actuator of the CRV 27 to adjust the position of the 28 to a more open position in response to an estimated pressure of air between the compressor 60 and compressor 150 decreasing below a threshold, where the threshold may be approximately BP.

As such, outputs from the sensor 126 may be used to estimate decreases in air pressure downstream of the compressor 60 and upstream of the throttle 24 and compressor 150 due to, for example, the compressor 150 being turned on. Thus, based on outputs from pressure sensor 126, the controller 12 may adjust the CRV 27 to a more open position when powering on the compressor 150, if the pressure in the intake passage 42 between the compressor 60 and the compressor 150 decreases below a threshold, where the threshold may be approximately BP. Thus, the CRV 27 and first throttle 24 may function similarly, to regulate an amount of boost provided by the first compressor 60 and second compressor 150, respectively. However, the CRV 27 may additionally serve to minimize and/or prevent decreases in the air pressure between the first compressor 60 and second compressor 150 below a lower threshold, so that the pressure at the outlet 55 of the compressor 60 may be maintained at a higher pressure than the inlet 53 of the compressor 60 (e.g., barometric pressure).

The second compressor 150 may normally be off, and the first throttle 24 may be in an open position. In some examples, when the first throttle 24 is in the open position and the second compressor 150 is off, substantially no intake air may flow through the compressor 150 and/or boost passage 34. Thus, in examples where the throttle 24 is positioned in the intake passage 42, and compressor 150 is positioned in the boost passage 34, substantially all of the intake air flowing to the intake manifold 44 may flow through the intake passage 42 without flowing through the boost passage 34 when the throttle 24 is opened and/or the compressor 150 is off. However, in other examples, air may still flow through both the second compressor 150 and throttle 24, with the throttle 24 in an open position and the second compressor 150 off. In still further examples, the throttle 24 may remain closed when the second compressor 150 is off, and substantially all of the air flowing to the intake manifold 44 may flow through the second compressor 150.

It should also be appreciated that in other embodiments, the positioning of the throttle 24 and compressor 150 may be reversed, so that the throttle 24 is instead positioned in the boost passage 34, and the compressor 150 is positioned in the intake passage 42 between the first end 35 and second end 37 of where the boost passage 34 is coupled to the intake passage 42. In such embodiments, the throttle 24 may similarly be opened so that intake air flowing to the intake manifold 44 may bypass the compressor 150, except that, the intake air may flow through the boost passage 34. Thus, when the throttle 24 is opened, intake air may flow through the throttle 24, whether the throttle 24 is positioned in the boost passage 34 or the intake passage 42.

With the second compressor 150 off, engine torque demands may be met using the first compressor 60. However, at increasingly higher engine torque demands, increased mass air flow and boost may be requested. Thus, the first throttle 24 may be controlled in response to a torque request to supply the required mass air flow for the torque demand. In some examples, the compressor 60 may not be spinning fast enough to instantaneously supply the required boost pressure for a given torque request. Thus, there may be a delay between when a torque demand is received and the requested torque is output by the engine. This delay, referred to herein as turbo lag, may result from the amount of time it takes the compressor 60 to increase speed and supply the required boost.

In some embodiments, the second compressor 150 may be used to supply boost to the engine 10. For example, in response to torque demand increasing above a threshold level, the second compressor 150 may be powered on to supply boosted intake air to the intake manifold 44. The threshold level may be based on the current speed of the first compressor 60 and the amount of boost required to achieve the desired torque demand. In one example, the threshold level may decrease for decreases in the speed of the compressor 60 and/or increases in the torque demand and desired boost level. In another example, the threshold level may be a pre-set level based on the compressor 60. As described above, the desired engine torque may be estimated based on inputs from the vehicle operator 132 via the input device 130, as and such, the desired engine torque may increase over the threshold level in response to a tip-in, as indicated by an increase in pedal position and/or throttle position, for example pedal position transitioning from being at a fully released foot position to being engaged by the operator's foot greater than a threshold angle within a threshold duration.

The controller 12 may adjust flow through the intake passage 42 and/or boost passage 34 to supply the requested boost as quickly as possible. Specifically, upon receiving an engine torque request greater than the threshold level, the controller 12 may increase the opening of a second throttle 21 positioned downstream of the compressors 60 and 150, to increase airflow to the intake manifold 44. Additionally or alternatively, the controller 12 may turn on and drive the second compressor 150 to compress air provided to the intake manifold 44. The controller 12 may further close the throttle 24 so that air flowing to the intake manifold 44 flows through the compressor 150 before reaching the intake manifold 44. In this way, a boost pressure of air downstream of the compressor 150 may be increased. Additionally or alternatively as described above, in response to the torque demand increasing above the threshold level, the controller 12 may open the CRV 27 for a duration to reduce an amount of pressure drop in the volume of the intake 125 included between the two compressors 60 and 150. Said another way, the controller 12 may open the CRV 27 for a duration when powering on the compressor 150 in response to a torque demand greater than a threshold.

Once the speed of the first compressor 60 reaches a level sufficient to provide the desired boost level without further compression from the compressor 150, the compressor 150 may be turned off. Thus, the second compressor 150 may only be turned on when the amount of boost provided by the compressor 60 is not sufficient to meet the desired boost level. In other words, when the speed of the compressor 60, is less than a speed which may compress the intake air to a level that matches the desired boost level, the compressor 150 may be powered on to provide supplemental compression so that intake air may be compressed to the desired boost level more quickly than if only the compressor 60 is spinning.

Thus, the CRV 27 may be opened for a duration in response to an increase in the desired engine torque above a threshold, while the compressor 150 is turned on and/or running, so that air from upstream of compressor 60 in intake passage 42 may be drawn through the compressor 150. Instead of air only being drawn from a volume of the intake 125 included between the compressors 60 and 150, air may be drawn from both downstream and upstream of the compressor 60 by opening the CRV 27 when the compressor 150 is on. The suction generated by the compressor 150 when it is on and spinning may draw air from upstream of the compressor 150 through the compressor 150. As such, when the CRV 27 is open, and the compressor 150 is on, the compressor 150 may draw in air from the intake passage 42, upstream of the compressor 60. Thus, by opening the CRV 27 when the second compressor 150 is on and spinning, an amount of air drawn from the outlet 55 of the compressor 60 may be reduced relative to examples where the CRV 27 is kept closed.

In this way, the position of the CRV 27 may be adjusted to change the fluidic coupling of the two compressors 60 and 150 within the intake 125. For example, when the CRV 27 is closed, intake air flows through the first compressor 60 before flowing through one or more of the throttle 24 and second compressor 150. Thus, in examples where the CRV 27 is closed, the second compressor 150 may be said to be downstream of the first compressor 60, since intake air must flow through the first compressor 60 before flowing through the second compressor 150. However, in examples, where the CRV 27 is open and the pressure at the second end 41 of the bypass passage 38 is less than at the first end 39 of the bypass passage 38, such as when the compressor 150 is powered on and generating suction, intake air may flow through one or both of the bypass passage 38 and/or compressor 60. Intake air may from intake passage 42 upstream of the compressor 60, may therefore flow directly to the second compressor 150 when the CRV 27 is open without first flowing through the first compressor 60. Said another way, air provided to the intake manifold 44 may flow through and be compressed by the second compressor 150 without flowing through the first compressor 60 when the CRV 27 is open. More simply, intake air flowing to the intake manifold 44 may bypass the first compressor 60 when the CRV 27 is open.

Thus, intake air flowing to the intake manifold 44 via throttle 21, flows through either throttle 27 and bypass passage 38, or compressor 60, or both in conditions where air compressed by the compressor 60 is recirculated to upstream of the compressor 60 via the bypass passage 38, before flowing through either throttle 24 or second compressor 150, or both. In this way, the throttle 24 and second compressor 150 may be fluidically in parallel with one another when the throttle 24 is in an open position, and together may be downstream and in series with the throttle 27 and first compressor 60. Said another way, CRV 27 and first compressor 60 may be fluidically in parallel with one another when the CRV 27 is in an open position, and together may be upstream of the throttle 24 and compressor 150.

A second throttle 21 may be positioned in the intake passage 42, downstream of both of the compressors 60 and 150, for regulating an amount of intake air provided to the intake manifold 44. Thus, the intake passage 42 includes the second throttle 21 having a throttle plate 22 to regulate mass airflow into the intake manifold 44. In this particular example, the position (TP) of the throttle plate 22 may be varied by the controller 12 to enable electronic throttle control (ETC). In this manner, the second throttle 21 may be operated to vary the intake air provided from intake passage 42 to the combustion chambers 30. For example, the controller 12 may adjust the throttle plate 22 to increase an opening of the second throttle 21. Thus, substantially all air flowing to the intake manifold 44 must flow through the throttle 21 first, before entering the intake manifold 44. In this way, throttle 21 may be adjusted to regulate a mass airflow of air supplied to the intake manifold 44. Increasing the opening of the second throttle 21 may increase the amount of air supplied to the intake manifold 44. In an alternate example, the opening of the second throttle 21 may be decreased or closed completely to shut off airflow from the flow passage 32 to the intake manifold 44. In some embodiments, additional throttles may be present in intake passage 42, such as a throttle upstream of the compressor 60 (not shown).

The intake passage 42 may further include a charge air cooler (CAC) 80 (e.g., an intercooler) positioned downstream of the compressors 60 and 150 to decrease the temperature of the compressed intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from one or more of the compressors 60 and 150 enters the inlet of the CAC 80, cools as it travels through the CAC, and then exits to enter the engine intake manifold 44. Ambient air flow from outside the vehicle may enter engine 10 through a vehicle front end and pass across the CAC, to aid in cooling the charge air.

Although in the example shown in FIG. 1A, CAC 80 is shown positioned upstream of the throttle 21, it should also be appreciated that in other examples, the CAC 80 may be positioned downstream of the throttle 21, between the throttle 21 and the intake manifold 44. It should also be appreciated, the in other examples, the second end 37 of the boost passage 34 may be coupled to the intake passage 42 downstream of the CAC 80, and upstream of the throttle 21.

A temperature sensor 124 may be positioned in the intake passage 42 downstream of the CAC 80, for estimating a temperature of intake gasses downstream of the CAC 80. Thus, outputs from the temperature sensor 124 may be used to estimate a CAC cooling efficiency, and regulate an amount of boost provided by one or more of compressors 60 and 150, so that the temperature of intake gasses provided to the intake manifold 44 may be maintained to below a threshold temperature above which may result in knock and/or spontaneous combustion.

The engine system 100 may in some examples, further include an exhaust gas recirculation (EGR) system. FIGS. 1A-1B show a high pressure EGR system where EGR is routed from upstream of turbine 62 to downstream of compressor 60 through EGR passage 140. FIGS. 1A-1B also show a low pressure EGR system where EGR is routed from downstream of turbine 62 to upstream of compressor 60 through low pressure EGR passage 156.

Specifically, the engine system 100 may optionally include the high pressure EGR passage 140, which may route a desired portion of exhaust gas from the exhaust passage 48 to the intake passage 42 downstream of the first compressor 60. An amount of exhaust gasses routed through the EGR passage 140 may be regulated by an EGR valve 142 positioned in the EGR passage 140. Specifically, the controller 12 may send signals to an actuator of the EGR valve 142, to adjust a position of the valve 142 to either increase and/or decrease an amount of exhaust gasses flowing from the exhaust passage 48 to the intake passage 42. Under some conditions, the EGR system may be used to regulate the temperature of the air and fuel mixture within the combustion chambers 30.

The EGR passage may be coupled at a first end to exhaust passage 48 upstream of turbine 62, and at an opposite second end to the intake passage 42, downstream of the compressor 150 and throttle 24. Thus, the EGR passage 140 may be coupled to the intake passage 42 downstream of where the second end 37 of the boost passage 34 is coupled to the intake passage 42. However, it should be appreciated that in other examples, the EGR passage 140 may be coupled to the intake passage 42 upstream of where the second end 37 of the boost passage 34 is coupled to the intake passage 42. Specifically, the EGR passage 140 may be coupled to the intake passage 42 between where the first end 35 and second end 37 of the boost passage 34 are coupled to the intake passage 42. In still further examples, the EGR passage 140 may be coupled to the intake passage 42 between the compressor 60 and where the first end 35 of the boost passage 34 is coupled to the intake passage 42. However, it should be appreciated that in other examples, high pressure EGR passage 140 may not be included in engine system 100.

In the lower pressure EGR system, a low pressure EGR valve 154 may be positioned in the low pressure EGR passage 156 to control the amount of EGR provided to the intake passage 42 upstream of the compressor 60. Thus, the low pressure EGR passage 156 may be coupled on one end to the exhaust passage 48, downstream of the turbine 62, and on an opposite second end to the intake passage 42, upstream of the compressor 60. In some embodiments, the engine may include both the EGR passages 140 and 156, as shown in FIGS. 1A-1B. In other embodiments, the engine system 100 may include either EGR passage 140 or EGR passage 156. In yet further embodiments, the engine system 100 may not include either of the EGR passages 140 or 156.

The engine exhaust 175 may further include an emission control device 70. The emission control device 70 is shown arranged along the exhaust passage 48 downstream of the turbine 62. The device 70 may be a three way catalyst (TWC), NOx trap, diesel particulate filter, oxidation catalyst, various other emission control devices, or combinations thereof. As such, emission control device 70 may also be referred to herein as catalyst 70. In some embodiments, during operation of engine 110, emission control device 70 may be periodically reset by operating at least one cylinder of the engine within a particular air/fuel ratio.

Catalyst 70 can include multiple catalyst bricks, in one example. In another example, multiple emission control devices, each with multiple bricks, can be used. Thus, catalyst 70 may be configured to reduce nitrogen oxides (NOx), and oxidize carbon monoxide (CO) and unburnt hydrocarbons (HCs) to water and carbon dioxide.

The controller 12 is shown in FIGS. 1A-1B as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine system 100 for performing various functions to operate the engine system 100. In addition to those signals previously discussed, these signals may include measurement of inducted mass air flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors that may send signals to controller 12 include a temperature sensor 124 at an outlet of a charge air cooler 80, boost pressure sensor 126, and boost pressure sensor 136. Other sensors not depicted may also be present, such as a sensor for determining the intake air velocity at the inlet of the charge air cooler, and other sensors. In some examples, storage medium read-only memory chip 106 may be programmed with computer readable data representing instructions executable by microprocessor unit 102 for performing the methods described below as well as other variants that are anticipated but not specifically listed. Example routines are described herein at FIGS. 2-3.

Focusing now on FIG. 1B, it shows another embodiment of the engine system 100 described above with reference to FIG. 1A, where the second compressor 150 is shown coupled in the intake passage 42 instead of the boost passage 34. Thus, the positions of the compressor 150 and throttle 42 shown in FIG. 1A, are reversed in FIG. 1B. Further, the bypass passage 38 is shown coupled on the second end 41 to the intake passage 42 downstream of the first compressor 60, and upstream of where the first end 35 of the boost passage 34 is coupled to the intake passage 42. Thus, the second end of the bypass passage 38 may be coupled to the intake passage 42 upstream of the compressor 150 and throttle 24, in examples where the throttle 24 is included in the intake 125.

As explained above with reference to FIG. 1A, the second compressor 150 may be positioned in the intake passage 42, downstream of the first compressor 60. In some examples, boost passage 34 may be included in the intake 125, and may be coupled to the intake passage 42 across the compressor 150. Throttle 24 may be positioned in boost passage 34 for diverting air around the compressor 150. Thus, as described above with reference to FIG. 1A, the throttle 24 may be normally closed, and may be opened to reduce an amount of boost provided by the second compressor 150. The throttle 24 may be opened in response to the boost pressure in the intake passage 42 downstream of the compressor 150 increasing above the desired boost level. Boost pressure downstream of the compressor 150 may be estimated based on outputs from the boost pressure sensor 136.

It should also be appreciated that in other examples, one or more of boost passage 34, and/or throttle 24 may not be included in the engine system 100. Thus, in examples where the boost passage 34 and throttle 24 are not included in the engine system 100, compressor 150 may be positioned in the intake passage 42, and in such examples, intake air flows through the second compressor 150, before flowing to the intake manifold 44.

In this way, intake air may enter the engine system 100 through the intake passage 42. Intake air may then flow through one or more of the first compressor 60 and/or bypass passage 38. Specifically, when pressure in the intake passage 42 downstream of the compressor 60 at the outlet 55 of the compressor is greater than barometric pressure, the CRV 27 may be adjusted to achieve the desired boost level which delivers the desired engine torque. If the amount of boost provided by the compressor 60 is greater than the desired level, the CRV 27 may be opened to recirculate boosted air from downstream of compressor 60 to the intake passage 42 upstream of the compressor 60, thereby reducing boost pressure downstream of the compressor 60. However, if the pressure of air downstream of the compressor 60 is less than desired, the CRV 27 may be closed to increase an amount of boost provided by the compressor 60 to intake air.

If boost levels downstream of the compressor 60 decrease below a threshold (e.g., barometric pressure), the CRV 27 may be opened to allow for intake air in the intake passage 42 upstream of the compressor 60 to bypass the compressor 60 and flow to downstream of the compressor 60. For example, when the second compressor 150 is turned on, and air in one or more of the boost passage 34 and intake passage 42 between the first compressor 60 and second compressor 150 is sucked into the second compressor 150, the pressure at the outlet end of the compressor 60 may decrease below BP. As such, the CRV 27 may be opened, for a duration while the compressor 150 is turned on and/or running, so that air from upstream of compressor 60 in intake passage 42 may be drawn through the compressor 150. Instead of air only being drawn from a volume of the intake 125 included between the compressors 60 and 150, air may be drawn from both downstream and upstream of the compressor 60 by opening the CRV 27 when the compressor 150 is on. Thus, by opening the CRV 27 when the second compressor 150 is on and spinning, an amount of air drawn from the outlet 55 of the compressor 60 may be reduced relative to examples where the CRV 27 is kept closed. In this way, decreases in the air pressure at the outlet end 55 of the compressor may be minimized by opening the CRV 27 for a duration during powering on and/or running the second compressor 150.

Intake air may then flow from one or more of the bypass passage 38 and/or intake passage 42 downstream of the first compressor 60, to one or more of the second compressor 150 and/or throttle 24, when included in the engine system 100. It should be appreciated that while the CRV 27 is open, intake air may enter and be compressed by the second compressor 60, without flowing through the first compressor 60. Thus, intake air at BP, may bypass compressor 60 via the bypass passage 38 when the CRV 27 is open, and may flow directly to the second compressor 150. After flowing through one or more of the bypass passage 38 and/or compressor 60, and then through one or more of the throttle 24 and second compressor 150, intake air may then flow to the second throttle 21.

Second throttle 21, may therefore be adjusted to regulate a mass airflow rate of intake air into the intake manifold 44. Boost pressure in the intake passage 42 upstream of the throttle 21 may therefore increase as the throttle 21 is adjusted to a more closed position while one or more of the compressors 60 150 are spinning. Conversely boost pressure in the intake passage 42 upstream of the throttle 21 may decrease as the throttle 21 is adjusted to a more open position for relatively constant compressor speeds.

In this way, a desired engine torque may be achieved by regulating boost pressure to a desired level via one or more compressors, and adjusting a throttle so that a mass airflow rate sufficient to produce the desired engine torque may be provided to an intake manifold and delivered to one or more engine cylinders. Boost pressure may be regulated by adjusting the speed of a first compressor via a wastegate valve. Further, boost pressure may be regulated by adjusting the position of a CRV coupled in a bypass passage around the first compressor. Additionally, electric power to a second compressor may be adjusted to increase boost pressure. An amount of boost provided by the second compressor may be regulated by adjusting a throttle positioned in a conduit coupled across the second compressor. While the second compressor is spinning, the CRV may be opened for a duration so that a boost level at an outlet end of the first compressor may be maintained above a threshold, where the threshold may be approximately barometric pressure. In this way, an amount of boost provided by each of the compressor may be regulated by adjusting the position of respective valves positioned in conduits bypassing the compressors. Said another way, the pressure at outlet ends of the compressors may be regulated by adjusting the position of the valves positioned in the conduits bypassing the compressors.

Figure 2:
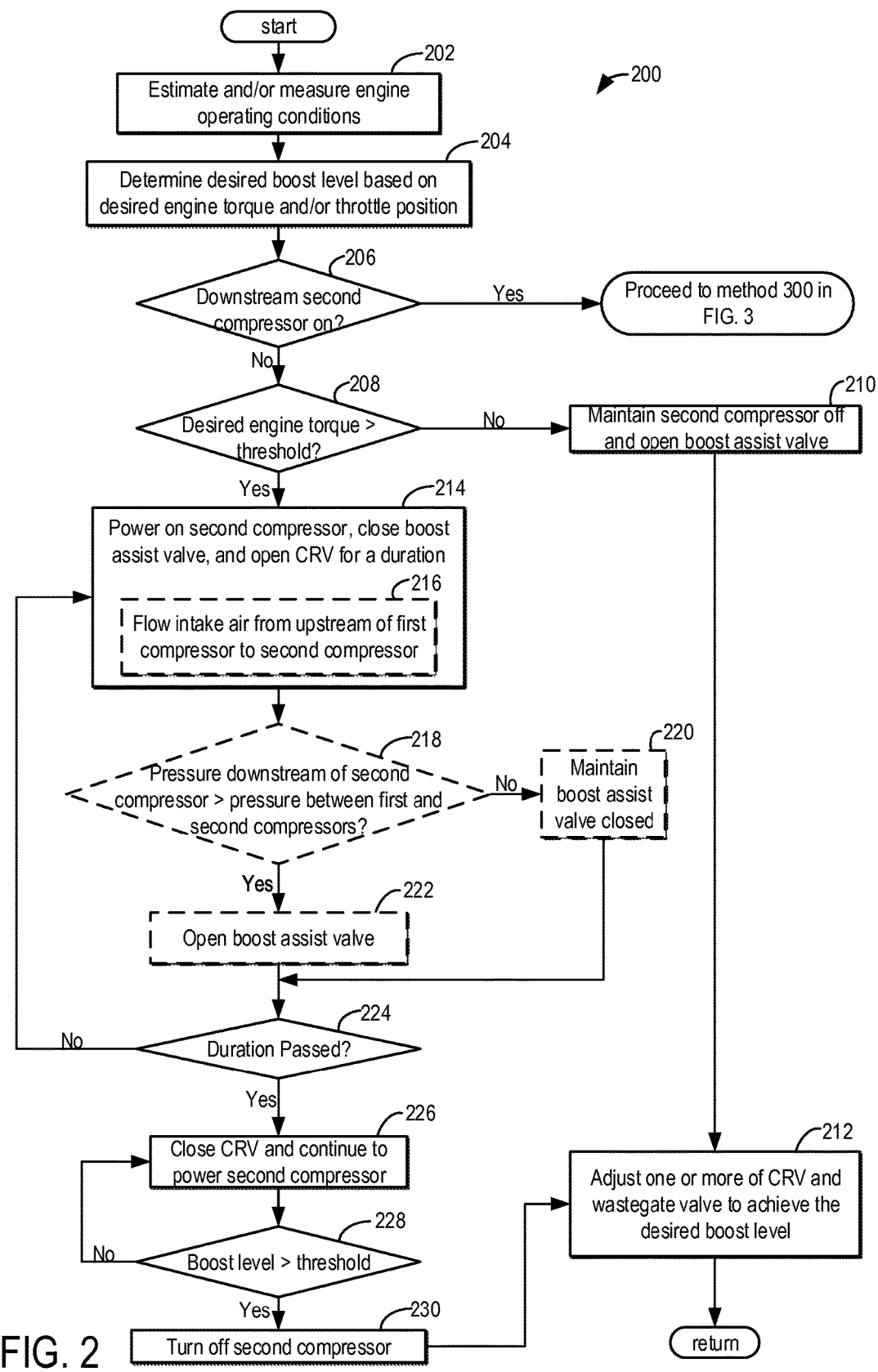
FIG. 2 shows a flow chart of an example method for regulating boost pressure in an engine intake in response to a tip-in event.
Figure 3:
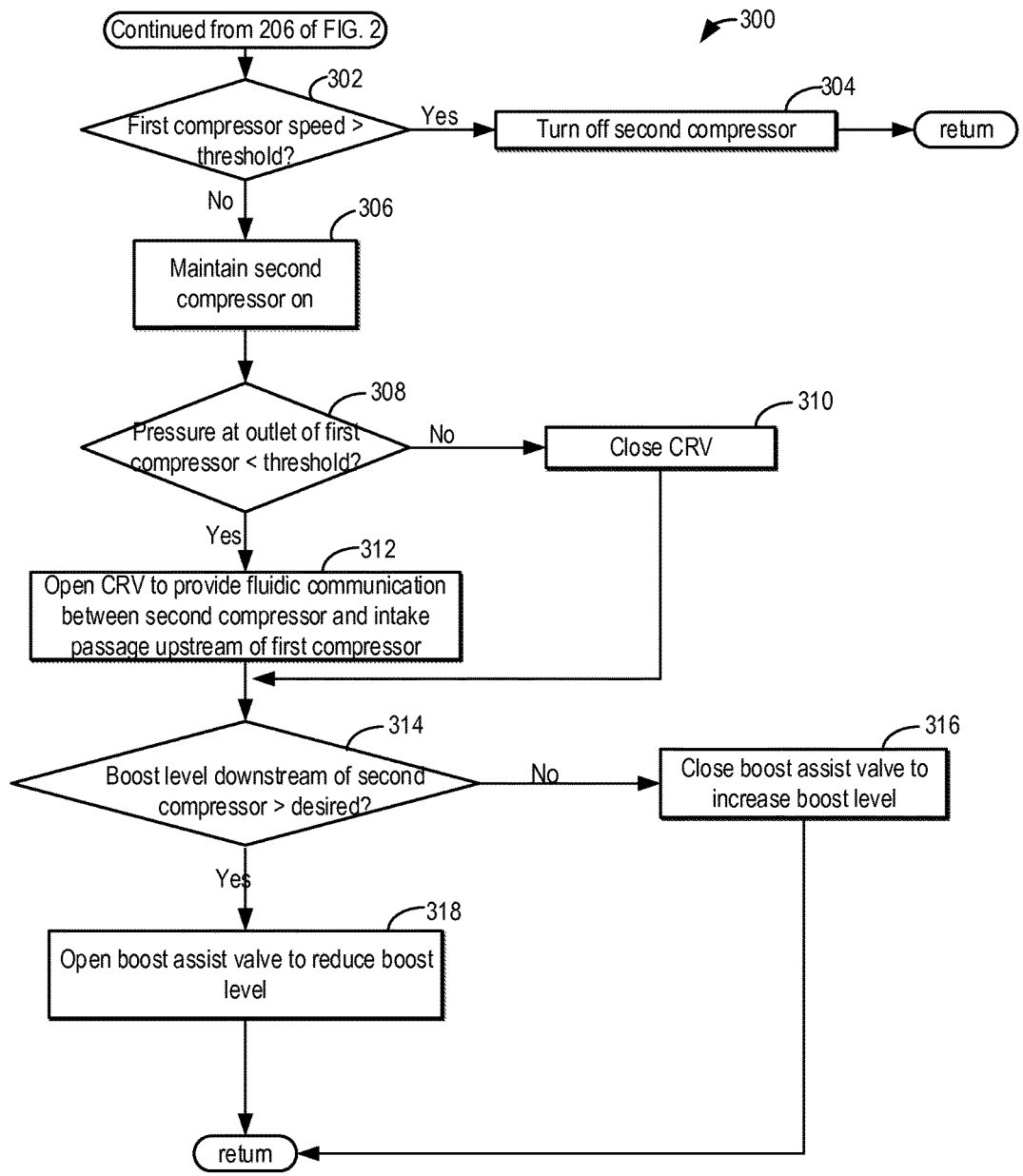
FIG. 3 shows a flow chart of an example method for regulating boost pressure in an engine intake when two compressors in the intake are on and spinning.

Turning now to FIGS. 2 and 3, they show flow charts of example methods, 200 and 300 respectively, for regulating intake airflow through in an intake system (e.g., engine intake 125 shown in FIGS. 1A and 1B) to one or more engine cylinders (e.g., cylinders 30 shown in FIGS. 1A and 1B). The flow chart in FIG. 2 shows an example method for regulating boost pressure in the intake in response to a tip-in event, where a desired engine torque increases above a threshold. Specifically, when the speed of an upstream first compressor (e.g., first compressor 60 shown in FIGS. 1A-1B) is insufficient to provide the desired engine torque, a downstream second compressor (e.g., compressor 150 shown in FIGS. 1A and 1B) may be turned on to provide additional boost pressure. When powering on the second compressor, a CRV (e.g., CRV 27 shown in FIGS. 1A and 1B) may be opened so that vacuum at an outlet (e.g., outlet 55 shown in FIGS. 1A and 1B) of the first compressor may be reduced. The flow chart in FIG. 3 shows an example method for regulating boost pressure in the intake when the second compressor is on and spinning. As such, methods 200 and 300 may be described together in the description herein.

Instructions for carrying out methods 200 and 300 may be stored in non-transitory memory of a controller (e.g., controller 12 shown in FIGS. 2A-2B). As such, methods 200 and 300 may be executed by the controller based on the stored instructions and in conjunction with signals received from sensors of an engine system (e.g., engine system 100 shown in FIGS. 1A-1B), such as the sensors described above with reference to FIGS. 1A-1B. The controller may employ engine actuators of the engine system to adjust engine operation, according to the methods described below. In particular, the controller may adjust a position of a compressor bypass valve or compressor recirculation valve (e.g., CRV 27 shown in FIGS. 1A and 1B) in response to a desired engine torque increasing above a threshold.

Focusing now on FIG. 2, method 200 begins at 202 which comprises estimating and/or measuring engine operating conditions. Engine operating conditions may include a boost pressure of intake gasses as estimated based on outputs from one or more pressure sensors (e.g., pressure sensors 126 and 136 shown in FIGS. 1A and 1B), a mass airflow rate of intake gasses as estimated based on outputs from a MAF sensor (e.g., MAF sensor 120 shown in FIGS. 1A and 1B), an engine speed as estimated from a crankshaft position sensor (e.g., Hall effect sensor 118 shown in FIGS. 1A and 1B), a driver demanded torque or desired engine torque as estimated based on input from a vehicle operator (e.g., vehicle operator 132 shown in FIGS. 1A and 1B) via an input device (e.g., input device 130 shown in FIGS. 1A and 1B), a temperature of intake gasses as estimated based on outputs from a temperature sensor (e.g., temperature sensor 124 shown in FIGS. 1A and 1B), a position of a throttle (e.g., throttle 21 shown in FIGS. 1A and 1B) regulating airflow to the one or more engine cylinders, operation of an upstream first compressor (e.g., first compressor 60 shown in FIGS. 1A and 1B), operation of a downstream second compressor (e.g., second compressor 150 shown in FIGS. 1A and 1B), manifold air pressure (MAP) as estimated based on outputs from a pressure sensor (e.g., pressure sensor 122 shown in FIGS. 1A and 1B) coupled in an intake manifold (e.g., intake manifold 44 shown in FIGS. 1A and 1B), etc.

After estimating engine operating conditions at 202, method 200 may then proceed to 204, which comprises determining a desired boost level based on the desired engine torque and/or throttle position. The desired engine torque may be determined based on a position of the input device as estimated based on outputs from a position sensor (e.g., sensor 134 shown in FIGS. 1A-1B) configured to measure a position of the input device. Thus, as the input device becomes more depressed, the desired engine torque may increase. Instances where the input device is depressed by the vehicle operator may be commonly referred to as tip-in events. Further, the desired engine torque may be estimated based on a road incline, vehicle weight, alternator load, etc.

Based on the desired engine torque, a mass airflow rate may be adjusted, so that the resulting output engine torque approximately matches the desired engine torque. Said another way, a known relationship between mass airflow rates and output engine torques may be stored in memory of the controller, and the controller may thereby determine a mass airflow rate needed to achieve the desired engine torque. Further, a fuel injection amount may be calculated based on the mass airflow rate and a desired air/fuel ratio such as stoichiometric (14.7:1). Thus, the fuel injection amount may be adjusted to achieve the desired air/fuel ratio.

The mass airflow rate may be adjusted by adjusting the position of the throttle and/or adjusting the boost pressure (e.g., pressure of gasses in the intake). Thus, a desired throttle position and/or a desired boost level sufficient to produce the mass airflow rate may be determined at 204. Said another way, the mass airflow rate may be increase by adjusting the position of the throttle to a more open position. Thus, for increases in the desired engine torque, the throttle may be adjusted to a more open position so that an opening formed by the throttle may be increased to increase the mass airflow rate there-through. Further, the mass airflow rate may be increased by increasing the boost pressure. By increasing the boost pressure an amount of gasses per unit volume may be increased, and thus the mass airflow rate may be increased.

In some examples, the desired boost level may be based on one or more of the desired engine torque, manifold air pressure, throttle position, a difference between actual engine torque output and the desired engine torque output, and an ignition timing (e.g., spark retard/advance from MBT). Thus, the desired boost level may increase for increases in the desired engine torque, decreases in the intake manifold pressure, increases in the opening of the throttle, etc. Further, the desired boost level may decrease when the actual engine torque outputs exceeds the desired engine torque, and may increase when the actual engine torque output decreases below the desired engine torque. Thus, in some examples, the desired boost level may be estimated based on a known relationship (e.g., lookup table stored in memory of the controller) between desired engine torque and desired boost level. However, the desired boost level may additionally or alternatively be determined based on current engine operating conditions such as the manifold air pressure, actual boost level as estimated from the one or more pressure sensors, etc. In this way, the desired boost level may be estimated based on the desired engine torque, and then adjusted based on current engine operating conditions. As explained in greater detail below, the boost level may be regulated by operation of one or more compressors, and adjusting of one or more of the CRV and a boost assist valve.

After determining the desired boost level at 204, method 200 may continue to 206 which comprises determining if the second compressor is on. The controller may adjust operation of the second compressor by regulating an amount of electrical power supplied to the second compressor from an alternator (e.g., alternator 152 shown in FIGS. 1A and 1B) and/or supercapacitor. Thus, based on signals sent from the controller to one or more of the alternator and/or second compressor, the controller may determine the current amount of electrical power supplied to the second compressor. In this way, the controller may determine that the second compressor is on, if for example, the current supplied to the second compressor by the alternator is non-zero. More simply, operation of the second compressor may be determined based on an amount of electrical power supplied to the compressor, where the compressor may be determined to be off when the electrical power (e.g., current and/or voltage) supplied to the compressor is approximately zero.

If it is determined at 206 that the downstream second compressor is on, then method 200 may proceed to method 300 described below with reference to FIG. 3. However, if it is determined at 206 that the downstream second compressor is not on (e.g., off) then method 200 may proceed from 206 to 208 which comprises determining if the desired engine torque is greater than a threshold. For example, the method 200 at 208 may comprise determining if a tip-in event has occurred. Said another way, the method 200 at 208 may comprise determining if the vehicle operator has depressed the input device. The threshold engine torque at 208 may be a pre-set engine torque level stored in the memory of the controller. However, in other examples, the threshold engine torque level may be adjusted and/or estimated based on current engine operating conditions. The threshold engine torque level, may be a torque level below which the desired boost level may be achieved via a current speed of the first compressor. Thus, above the threshold at 208, the current speed of the first compressor may not be sufficient to deliver the desired boost level. Said another way, the threshold at 208 may represent the current boost level provided by the first compressor. The boost level provided by the first compressor may be estimated by a first pressure sensor coupled in the intake downstream of the first compressor (e.g., pressure sensor 126 shown in FIGS. 1A and 1B). In some examples, the first pressure sensor may be coupled upstream of the second compressor, so that the first pressure sensor is configured to estimate the amount of boost provided by the first compressor only. As described above the amount of boost may be an amount that intake air is pressurized relative to barometric pressure (BP).

However, it should be appreciated that in other examples, the threshold at 208 may be a rate of increase (e.g., derivative) of the desired engine torque. Thus, if the desired engine torque increases at rate higher than the threshold at 208, method 200 may proceed to 214 from 208.

If it is determined at 208 that the desired engine torque is not greater than the threshold, method 200 may continue from 208 to 210 which may comprise maintaining the second compressor off and opening a boost assist valve (e.g., first throttle 24 shown in FIGS. 1A and 1B). The boost assist valve may be coupled across the second compressor, so that an amount of air flowing around the second compressor may be regulated by the boost assist valve. Specifically, as described above with reference to FIGS. 1A and 1B, with the compressor off, an amount of air flowing through the compressor may decrease as the boost assist valve is adjusted to a more open position. The boost assist valve, when in an open position may in some examples, provide a less flow restrictive path for gasses in the intake than the second compressor. As such, with the boost assist valve in an open position, a portion of the intake gasses may bypass the second compressor en route to the engine cylinders. However, it should be appreciated that in other examples, the method at 210 may comprise maintaining the second compressor off only, and may not include adjusting the boost assist valve.

The boost assist valve may include a throttle plate (e.g., throttle plate 25 shown in FIGS. 1A and 1B), where the throttle plate may be adjusted to change the size of an opening formed by the throttle plate. In some examples, the boost assist valve may be a binary valve, where the valve may be adjusted to either a fully closed position where substantially no gasses flow through the valve, or a fully open position. However, in other examples, the boost assist valve may be a continuously variable valve, where the valve may be adjusted to the fully closed position and fully open position and any position there-between. The amount of intake air flowing through the boost assist valve may increase as the valve is adjusted towards the fully open position and away from the fully closed position and vice versa. Specifically, the position of the valve may be adjusted by an actuator of the valve in response to signals received from the controller. In this way, the controller may adjust the position of the boost assist valve. Further, the controller may adjust the position of any other valves described herein, in the same or similar manner as described above for the boost assist valve.

After maintaining the compressor off at 210, method 200 may then continue to 212 which comprises adjusting one or more of the CRV and a wastegate valve (e.g., wastegate valve 26 shown in FIGS. 1A and 1B) to achieve the desired boost level. Thus, with the second compressor off, the boost level may be adjusted to match the desired boost level via adjusting of one or more of the CRV and wastegate valve. Specifically, as described above with reference to FIGS. 1A and 1B, the CRV may be opened to prevent and/or reduce compressor surge. Thus, method 200 at 212 may include predicting if compressor surge will occur. If compressor surge is not expected to occur, the CRV may be maintained in a closed position. However, if compressor surge is expected to occur, the CRV may be opened to provide fluidic communication between downstream of the first compressor and upstream of the first compressor and thus recirculate boosted air from downstream of the first compressor to upstream of the first compressor to reduce an amount of boost provided by the first compressor.

Thus, one or more of the CRV and wastegate valve may be adjusted to a more open position to decrease an amount of boost provided by the first compressor. Conversely, one or more of the CRV and wastegate valve may be adjusted to a more closed position to increase an amount of boost provided by the first compressor. Thus, in response to the estimated boost level (as estimated based on outputs from the one or more pressure sensors) decreasing below the desired boost level, one or more of the CRV and wastegate valve may be adjusted to a more closed position to increase the boost provided by the first compressor. Further, in response to the estimated boost level increasing above the desired boost level, one or more of the CRV and wastegate valve may be adjusted to a more open position to decrease the boost provided by the first compressor. In this way, the CRV and wastegate valve may be adjusted in response to changes in the desired boost level, so that the actual boost level approximately matches the desired boost level. Method 200 may then return.

The CRV and/or wastegate valve may be continuously variable valves, and the valves may be operated in the same or similar manner described above with reference to operation of the boost assist valve. In still further examples, the CRV and/or wastegate valve may be binary valves.

Returning to 208, if it is determined that the desired engine torque is greater than the threshold, then method 200 may continue from 208 to 214 which comprises powering on the second compressor, closing the boost assist valve and opening the CRV for a duration. Thus, the method at 214 may comprise supplying electrical power to the second compressor, so that the second compressor may turn on and simultaneously opening the CRV for the duration. Said another way, the opening the CRV and powering on the second compressor may be performed concurrently.

Therefore, the speed of the second compressor may increase in response to the increased electrical power supplied thereto. Further, the boost assist valve may be adjusted to the fully closed position so that substantially no air flows there-through, and so that substantially all of the air flowing to the engine cylinders flows through the second compressor. In this way, the boost pressure may be increased.

However, it should be appreciated that in some examples, the method at 214 may not comprise closing the boost assist valve, and that the method at 214 may only comprise powering on the second compressor and opening the CRV for a duration.

Opening the CRV at 214 may comprise opening the CRV to a fully open position. However, in other examples, the CRV may be adjusted to a more open position between the fully closed position and the fully open position. If the CRV is already open at 214, then the method 200 at 214 may include maintaining the position of the CRV in the open position. The duration may in some examples be an amount of time. For example, the duration may be approximately 0.5 seconds. The duration may be any amount of time in a range of times between 0.2-2 seconds. Thus, the CRV may be opened for only the duration. After the duration has passed/expired, the CRV may be adjusted back to the fully closed position. In other examples, the duration may be a number of engine cycles, a duty cycle of the CRV, etc.

In still further examples, the duration may be adjusted based on a speed of the first compressor when powering on the second compressor, and/or a pressure at an outlet (e.g., outlet 55 shown in FIGS. 1A and 1B) of the first compressor. The speed of the first compressor may be estimated based on outputs from a rotational speed sensor (e.g., sensor 79 shown in FIG. 1A) coupled to the first compressor for measuring a rotational speed of the first compressor. Thus, the duration may be an amount of time it takes the speed of the first compressor to reach a lower first threshold speed. In this way, the CRV may be maintained in an open position, until the speed of the first compressor has reached the lower first threshold speed, where in some examples the lower first threshold speed may be a compressor speed sufficient to provide an amount of to maintain a higher pressure at the outlet of the first compressor than at the inlet with the second compressor on and spinning. Additionally or alternatively, the duration may be based on a pressure at the outlet of the first compressor. The pressure at the outlet of the first compressor may be estimated based on outputs from a pressure sensor (e.g., pressure sensor 126 shown in FIGS. 1A and 1B) positioned between the first and second compressors. Thus, the duration may be an amount of time it takes for the pressure at the outlet of the first compressor to increase above a lower first threshold pressure. In some examples the first threshold pressure may be approximately the same as a pressure at an inlet (e.g., inlet 53 shown in FIGS. 1A and 1B) of the first compressor. In another example the first threshold pressure may be approximately ambient pressure. In other examples, the threshold may be greater or less than the inlet pressure and/or ambient pressure.

As explained above with reference to FIGS. 1A and 1B, when the second compressor is turned on, the suction generated by the second compressor may reduce the pressure in the intake volume included between the first and second compressors. Specifically, the second compressor may be turned on when the speed of the first compressor is still relatively low, and is insufficient to meet the desired boost level. Thus, the boost provided by the first compressor may be relatively low when the second compressor is turned on. Since the second compressor may speed up more quickly than the first compressor, due at least partly to the second compressor being powered by electricity instead of exhaust gas flow, the pressure downstream of the first compressor and upstream of the second compressor may decrease when the second compressor is powered on at 214.

By opening the CRV for the duration when powering on the second compressor, intake air from upstream of the first compressor may bypass the first compressor and flow to the second compressor without flowing through the first compressor. Thus, the method 200 at 214 may include routing intake air from upstream of the first compressor to the second compressor at 216. In some examples, by opening the CRV, air may flow from both upstream of the first compressor and downstream of the first compressor to the second compressor. However, in other examples, substantially all of the air flowing to the second compressor may be drawn from upstream of the first compressor. In this way, decreases in the pressure of intake air in the volume of the intake included between the two compressors may be reduced. Said another way, by opening the CRV for a duration when powering on the second compressor, an amount of decrease in the pressure at an outlet (e.g., outlet 55 shown in FIGS. 1A and 1B) of the first compressor may be minimized. Thus, by opening the CRV for the duration, a pressure drop across the first compressor may be maintained to above a threshold, where pressure differentials below the threshold may result in oil leakage in the first compressor. Specifically, a higher pressure may be maintained at the outlet of the first compressor than at an inlet (e.g., inlet 53 shown in FIGS. 1A and 1B) of the first compressor.

After powering on the second compressor and opening the CRV at 214, method 200 may in some examples continue to 218 which comprises determining if the pressure downstream of the second compressor is greater than the pressure between the first and second compressors. However, in other examples, the method 200 may proceed directly from 214 to 224 which comprises determining if the duration has passed/expired.

At 218, the pressure downstream of the second compressor may be estimated based on outputs from a second pressure sensor coupled in the intake downstream of the second compressor (e.g., pressure sensor 136 shown in FIGS. 1A and 1B). In some examples, the method 200 at 218 may comprise determining if the pressure downstream of the second compressor is greater than the desired boost level. In other examples, the method 200 at 218 may comprise determining if a difference between the pressure downstream of the second compressor and the pressure upstream of the second compressor is greater than a threshold difference.

In one example, if the pressure downstream of the second compressor is determined at 218 to not be greater than pressure between the first and second compressor and/or not be greater than the desired boost level, then method 200 may continue from 218 to 220 which comprises maintaining the boost assist valve in the closed position. In other examples, the method 200 may continue from 218 to 220 if the difference between the pressure downstream of the second compressor and upstream of the second compressor between the first and second compressors is not greater than the threshold difference. In this way, the boost pressure downstream of the second compressor may be increased.

However, if one or more of the pressure downstream of the second compressor is greater than the pressure between the first and second compressor and/or is greater than the desired boost level, and/or is greater than the threshold pressure difference, then the method 200 may continue from 218 to 222 which comprises opening the boost assist valve. By opening the boost assist valve at 222, since the pressure downstream of the second compressor may be greater than upstream of the second compressor, air from downstream of the second compressor may flow to upstream of the second compressor, between the first compressor and the second compressor. In this way, the boost pressure downstream of the second compressor may be reduced. Thus, if the boost level downstream of the second compressor increases above the desired boost level while the second compressor is on, the boost assist valve may be opened to reduce the boost level downstream of the second compressor, and thus, match more closely, the boost level to the desired boost level. Further, by opening the boost assist valve, the pressure of intake air in the intake volume included between the two compressors may be increased, so that a pressure at the outlet of the first compressor may be increased. In this way, oil leakage in the first compressor may be reduced.

Method 200 may then proceed from either 220, 222, or 214 to 224 which comprises determining if the duration has passed. If the duration since the start of when the CRV was opened at 214 has not passed, then method 200 may return to 214 from 224 and continue to maintain the CRV in the open position. Thus, the CRV may be maintained in the open position for the duration. Once the duration has passed, method 200 may continue from 224 to 226 which comprises closing the CRV and continuing to power the second compressor. Thus, at 226 the CRV may be adjusted to the fully closed position such that substantially no air may flow there-through.

In this way, the CRV may be closed once the first compressor has reached the threshold speed at which the boost pressure provided by the first compressor may be sufficient to maintain a higher pressure at the outlet of the compressor than at the inlet, with the second compressor on and spinning. Said another way, the CRV may closed once the pressure at the outlet of the first compressor reaches a lower first threshold pressure. After closing the CRV at 226, method 200 may continue to 228 which comprises determining if the boost level downstream of the second compressor (e.g., pressure at the outlet of the first compressor) is greater than a higher second threshold. In some examples the second threshold may be the desired boost level. However, in other examples, the second threshold may greater or less than the desired boost level. In other examples, the method at 228 may comprise determining if the speed of the first compressor is greater than a higher second threshold speed. The higher second threshold speed may represent a compressor speed at which the desired boost level may be achieved with the second compressor off. However, in other examples, the higher second threshold speed may be greater or less than a speed sufficient to provide the desired boost level, but may be a speed sufficient to generate a higher pressure at the outlet of the compressor than at the inlet of the compressor. Thus, the higher second threshold speed may depend on the desired boost level, where the higher second threshold speed may increase for increase in the desired boost level, since higher compressor speeds may be required to provide higher desired boost levels.

If the boost level downstream of the second compressor is not greater than the threshold, and/or the compressor speed is not greater than the higher second threshold speed, then method 200 may return to 226 from 228 and may continue to power the second compressor. However, once the boost level reaches the threshold at 228 and/or the compressor speed reaches the higher second threshold speed, the method 200 may continue to 230 and turn off the second compressor. Thus, the controller may cease to supply electrical power to the second compressor, in response to the boost level downstream of the second compressor reaching the threshold. In other examples, the controller may turn off the second compressor, in response to the speed of the first compressor reaching a speed sufficient to deliver the desired boost level without further compression from the second compressor.

After turning off the second compressor at 230, method 200 may continue to 212 which may comprise adjusting the boost level to the desired boost level via one or more of the CRV and wastegate valve. Method 200 then returns.

Focusing now on FIG. 3, it shows a method for regulating boost pressure in the intake when the second compressor is powered on. Method 300 may continue from 206 of FIG. 2 in response to a determination that the second compressor is on.

Method 300 begins at 302 which comprises determining if the speed of the first compressor is greater than a threshold. The speed of the compressor may be estimated based on outputs from a position sensor or Hall effect sensor, or other sensor configured to measure the frequency of rotation of the first compressor (e.g., sensor 79 shown in FIG. 1A). In some examples, the threshold speed may be a pre-set speed stored in the memory of the controller. However, in other examples, the threshold speed may be adjusted based on engine operating conditions such as the desired boost level. Thus, the threshold speed may increase for increases in the desired boost level and vice versa. The threshold speed may represent a compressor speed that is sufficient to deliver the desired boost level.

If the speed of the first compressor is greater than the threshold speed at 302, method 300 may continue to 304 which comprises turning off the second compressor. Thus, the method 300 at 304 may comprise sending signals to the alternator to stop providing electrical power to the second compressor. In this way, electrical power may no longer be provided to the second compressor at 304. Method 300 may then return.

However, if it is determined at 302 that the speed of the first compressor is not greater than the threshold at 302, then method 300 may continue to 306 which comprises maintaining the second compressor on. Thus, the method 300 at 306 may comprise sending signals to the alternator to continue supplying electrical power to the second compressor. Method 300 may then proceed to 308 which comprises determining if the pressure at the outlet of the first compressor is less than a threshold. In some examples the threshold at 308 may be approximately BP. However, in other examples, the threshold may be greater or less than BP. In still further examples, the threshold may depend on the pressure at the inlet of the compressor. The threshold may in some examples be approximately the same as the pressure at the inlet of the compressor. However, in other examples, the threshold may be greater than or less than the pressure at the inlet of the compressor. If the pressure at the outlet of the first compressor is not less than the threshold at 308, then method 300 may continue from 308 to 310 which comprises closing the CRV. If the CRV is already in the fully closed position, then method 300 at 310 may comprise maintaining the position of the CRV in the fully closed position.

Returning to 308, if it is determined that the pressure at the outlet of the first compressor is less than threshold, then method 300 may continue from 308 to 312 which may comprise opening the CRV to provide fluidic communication between the second compressor and an intake passage (e.g., intake passage 42 shown in FIGS. 1A and 1B) upstream of the first compressor. In this way, when the second compressor is on and spinning, the CRV may be opened in response to the pressure at the outlet of the second compressor decreasing below the threshold. As explained above with reference to FIGS. 1A-2, by opening the CRV when the second compressor is on, pressure at the outlet of the first compressor may be maintained above the threshold. In this way, pressure decreases at the outlet of the first compressor may be minimized when the second compressor is on and generating suction at the outlet of the first compressor.

Method 300 may then continue to 314 from either 310 or 312, where 314 comprises determining if the boost level downstream of the second compressor is greater than the desired boost level. If the boost level downstream of the second compressor is not greater than the desired boost level at 314, then method 300 may continue from 314 to 316 which comprises closing the boost assist valve to increase boost level downstream of the second compressor. Thus, by closing the boost assist valve at 316, an amount of intake gasses flowing back to upstream of the second compressor from downstream of the second compressor may be reduced. Method 300 may then return.

However, if it is determined at 314 that the boost level downstream of the second compressor is greater than desired, then method 300 may continue from 314 to 318 which comprises opening the boost assist valve to reduce the boost level downstream of the second compressor. By opening the boost assist valve intake gasses may recirculate from downstream of the second compressor to upstream of the second compressor. In this way an amount of intake gasses flowing from downstream of the second compressor, between the second compressor and the throttle, to upstream of the second compressor, between the first and second compressor, may be increased and as such an amount of boost in the intake air provided to the intake manifold may be reduced. Method 300 then returns.

Turning now to FIGS. 4A and 4B, they shows two graphs 400 and 450, showing changes in mass airflow rates and engine speeds, respectively, in response to a desired engine torque increasing above a threshold. As explained above, when the desired engine torque increases above the threshold, an electric compressor (e.g., compressor 150 shown in FIGS. 1A and 1B) positioned downstream of a turbocharger compressor (e.g., compressor 60 shown in FIGS. 1A and 1B) may be powered on. In some examples, a compressor recirculation valve (e.g., CRV 27 shown in FIGS. 1A and 1B) may be opened for a duration while the electric compressor is powered on and/or running. The graphs 400 and 450, show how mass airflow rates and engine speeds may be affected by either opening or closing the CRV when the electric compressor is powered on in response to the desired engine torque increasing above the threshold. Specifically, graph 400, shows how the mass airflow to one or more engine cylinders (e.g., engine cylinders 30 shown in FIGS. 1A and 1B) remains approximately the same in examples where a compressor recirculation valve coupled across the turbocharger compressor remains closed or open. Similarly, graph 450 shows how the engine speed may remain approximately the same in examples where the CRV remains closed or open when the desired engine torque increases above the threshold and the electric compressor is turned on. Thus, the graphs 400 and 450 show how engine speed and mass airflow rates may respond due to the electric compressor being turned on, with the CRV open and closed.

As shown in graphs 400 and 450, time extends along the horizontal axis. Thus, time increases from left to right in each of the graphs 400 and 450. In graph 400, mass airflow rates increase from bottom to top along the vertical axis. The mass airflow rate may be given in units of kg of air per hour (kg/h). Similarly, engine speeds increase from bottom to top along the vertical axis in graph 450. Engine speeds may be given in units of revolutions per minute (RPM). Representative times are provided along the time axis, representative mass airflow rates are provided along the mass airflow rate axis, and representative engine speed are provided along the engine speed axis. The time may be given in units of second (s). It is important to note that the times, engine speeds and mass airflow rates are merely representative, and may be different than shown in FIGS. 4A and 4B.

The plot 402, represented by the dashed lines in graphs 400 and 450 represents an example where the CRV is maintained in a fully closed position. Plot 404 represented by the solid line in graphs 400 and 450 represents an example where the CRV is maintained in an open position between $t_0$ and $t_3$.

Focusing on graph 400 shown in FIG. 4A, before $t_0$, the mass airflow rates may be approximately constant. At $t_0$, the desired engine torque may increase above a threshold, and the electric compressor may be turned on. For plot 404, the CRV may be opened at $t_0$. However, the CRV may remain closed at $t_0$ in plot 402. The mass airflow rates for both plots 402 and 404 may begin to increase after $t_0$ at approximately the same rate. Thus, between $t_0$ and $t_1$, the engine speed may be approximately the same in examples where the CRV is open (plot 404) as in examples where the CRV is closed (plot 402) as shown by the solid line between $t_0$ and $t_1$. At $t_1$ the mass airflow rate in examples where the CRV is maintained in the fully closed position (plot 402), may decrease below the mass airflow rate in examples where the CRV is adjusted to an open position. Thus, between $t_1$ and $t_2$, the mass airflow rates in examples where the CRV is adjusted to an open position (plot 404) may actually be greater than in examples where the CRV is maintained in a closed position (plot 402).

At $t_2$, the mass airflow rate in examples where the CRV is maintained in a closed position may increase above the mass airflow rate in examples where the CRV is kept open. Thus, between $t_2$ and $t_3$, the mass airflow rates in examples where the CRV is adjusted to an open position (plot 404) may be slightly less than in examples where the CRV is maintained in a closed position (plot 402). Then at $t_3$, the mass airflow rate for both examples where the CRV is kept open or closed, may converge and may be approximately the same. At $t_3$, the CRV may be closed in plot 404. Thus, between $t_0$ and $t_3$, plot 404 may represent an example where the CRV is open, and plot 402 may represent an example where the CRV is closed. Before $t_0$, and after $t_3$, plots 402 and 404 may converge since in both examples the CRV may be closed.

Focusing now on graph 450, before $t_0$, the engine speed may be approximately constant. At $t_0$, the desired engine torque may increase above a threshold, and the electric compressor may be turned on. Thus, $t_0$ in graph 450 may be the same as $t_0$ in graph 400. For plot 404, the CRV may be opened at $t_0$. However, the CRV may remain closed at $t_0$ in plot 402. The engine speed may begin to increase at $t_4$ at approximately the same rate for plot 402 and 404. Thus, between $t_4$ and $t_5$, the engine speed may be approximately the same in examples where the CRV is open (plot 404) as in examples where the CRV is closed (plot 402) as shown by the solid line between $t_4$ and $t_5$. At $t_5$ the engine speed in examples where the CRV is kept closed (plot 402) may increase slightly above the engine speed in examples where the CRV is kept open (plot 404). Between $t_5$ and $t_3$, the engine speed in examples where the CRV is maintained in the closed position (plot 402) may be greater than examples where the CRV is adjusted to an open position (plot 404). However, at $t_3$ the engine speeds for both examples where the CRV is kept open or closed, may converge and may be approximately the same. At $t_3$, the CRV may be closed in plot 404. Thus, between $t_0$ and $t_3$, plot 404 may represent an example where the CRV is open, and plot 402 may represent an example where the CRV is closed. Before $t_0$, and after $t_3$, plots 402 and 404 may converge since in both examples the CRV may be closed.

Thus, as shown by graphs 400 and 450, the CRV may be opened for a duration while powering on the electric compressor without reducing engine performance. Mass airflow rates and engine speeds may be maintained to approximately the same levels as would be obtained with the CRV closed during the duration while powering on the electric compressor. Said another way, opening the CRV for the duration in response to the desired engine torque increasing above the threshold, may reduce oil leakage at the first compressor, and may not result in decreases in engine speed and/or mass airflow rates, relative to examples where the CRV is kept closed during the duration.

Figure 5:
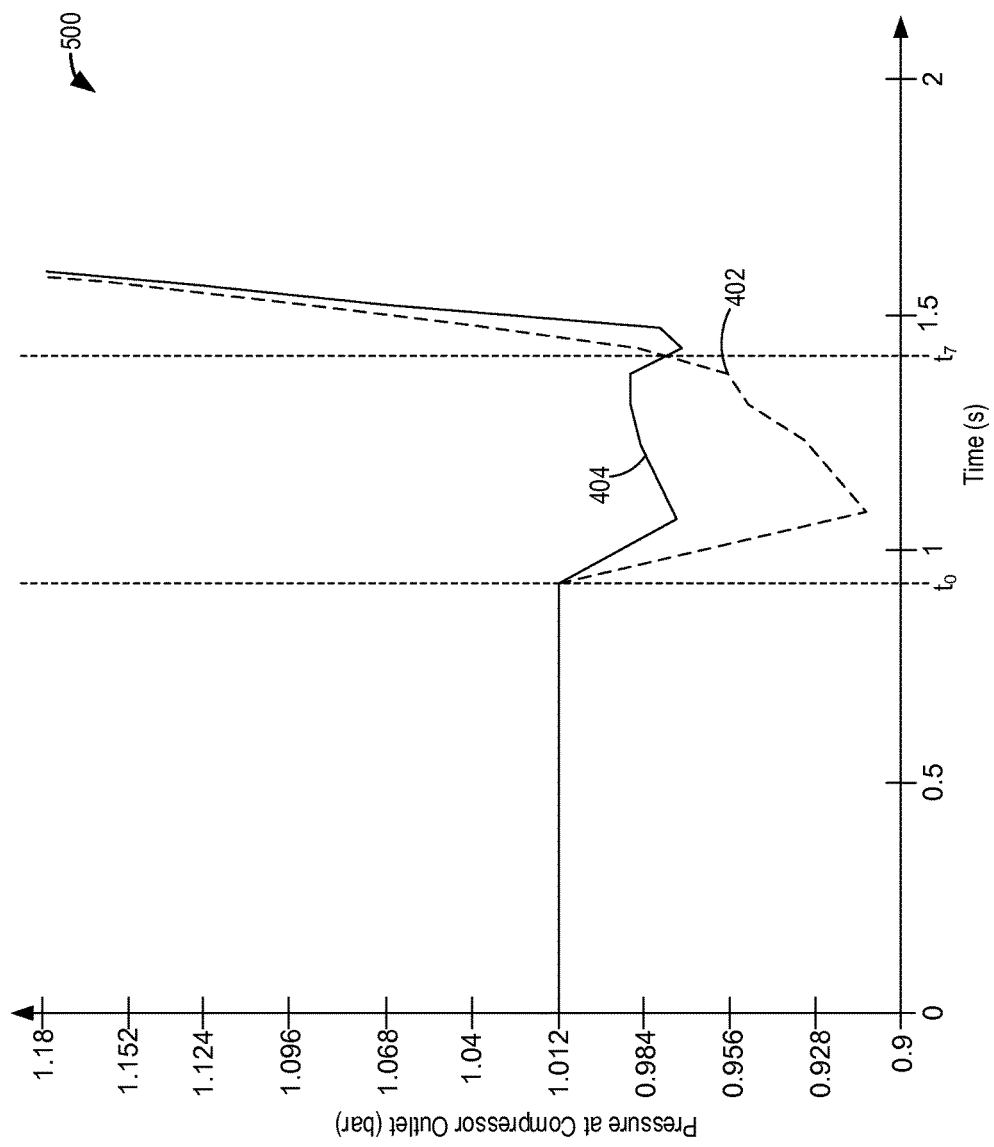
FIG. 5 shows a graph depicting how pressure at an outlet of a first compressor positioned upstream of a second compressor may be affected by either opening or closing a compressor recirculation valve in response to a desired engine torque increasing above a threshold.

Turning now to FIG. 5, it shows a graph 500 showing changes in pressure at an outlet (e.g., outlet 55 shown in FIGS. 1A and 1B) of a first compressor (e.g., first compressor 60 shown in FIGS. 1A and 1B) positioned upstream of a second compressor (e.g., second compressor 150 shown in FIGS. 1A and 1B). Specifically, the graph 500 shows changes in the outlet pressure of the first compressor, when a desired engine torque increases above a threshold. As explained above with reference to FIGS. 4A and 4B, when the desired engine torque increases above the threshold, the second compressor may be powered on. In some examples, a compressor recirculation valve (e.g., CRV 27 shown in FIGS. 1A and 1B) may be opened for a duration while the second compressor is powered on and/or running. The graph 500, show how the pressure at the outlet of the first compressor may be affected by either opening or closing the CRV when the downstream second compressor is powered on in response to the desired engine torque increasing above the threshold.

As shown in graph 500, time extends along the horizontal axis. Thus, time increases from left to right in graph 500. In graph 500, outlet pressure at the first compressor increase from bottom to top along the vertical axis. The pressure at the outlet of the first compressor may be given in units of bar. Representative times are provided along the time axis, and representative compressor outlet pressures are provided along compressor outlet pressure axis. The representative times may be given in units of seconds (s). It is important to note that the times, and compressor outlet pressures provided in graph 500 are merely representative, and may be different than depicted.

The plot 402, represented by the dashed lines in graph 500 represents an example where the CRV is maintained in a fully closed position. Plot 404 represented by the solid line in graph 500 represents an example where the CRV is maintained in an open position between $t_0$ and $t_7$. Thus, the graph 500 may represent the same timescale as graphs 400 and 450 described above with reference to FIGS. 4A and 4B. As such, graph 500 may be superimposed on one or more of graphs 400 and 450. Thus, graphs 400, 450, and 500 may show changes in mass airflow rates, engine speeds, and compressor outlet pressures over the same time period during engine operation. Said another way, graphs 400, 450, and 500 may be presented separately to depict more clearly how opening or closing the CRV affects each of mass airflow rates, engine speeds, and compressor outlet. However it should be appreciated that in some examples, the graphs 400, 450, and 500 may be overlaid on one another or in any combination. As such $t_0$ may represent the same point in time in all three of the graph 400, 450, and 500. Namely $t_0$ may represent the time when the desired torque level increases above a threshold, and the second compressor is powered on.

Focusing on graph 500, the outlet pressure of the first compressor may be approximately constant before $t_0$. At $t_0$, the desired engine torque may increase above a threshold, and the electric compressor may be turned on. In examples where the CRV is maintained in the fully closed position (plot 402), the compressor outlet pressure may decrease below the compressor outlet pressure in examples where the CRV is maintained in an open position (plot 404). Thus, at $t_0$, the CRV may be adjusted to an open position in plot 404, and a closed position in plot 402. Between $t_0$ and $t_7$, the pressure at the outlet of the compressor may be significantly less in examples where the CRV is held closed, than in examples where the CRV is held open. Said another way, the vacuum generated at the outlet of the first compressor may be significantly less when the CRV is opened relative to when it is kept closed between $t_0$ and $t_7$ as observed in plots 404 and 402, respectively between $t_0$ and $t_7$. Then at $t_7$, the mass airflow rate for both examples where the CRV is kept open or closed, may converge and may be approximately the same.

Thus, as shown by graph 500, the CRV may be opened for a duration while powering on the downstream second compressor to reduce an amount of vacuum generated at an outlet of the upstream first compressor and/or between the first and second compressors. Said another way, opening the CRV for the duration in response to the desired engine torque increasing above the threshold, may reduce oil leakage at the first compressor, by reducing an amount of vacuum generated at an outlet of the first compressor.

In this way, in response to a desired engine torque increasing above a threshold, a second compressor positioned in an engine intake downstream of a first compressor may be turned on. Specifically, the compressor may be an electric compressor, where power to the compressor may be provided by an alternator. Further, a compressor recirculation valve (CRV) positioned in a passage coupled across the first compressor may be opened in response to the desired engine torque increasing above the threshold and/or the second compressor being turned on. A first technical effect of minimizing pressure reductions at an outlet of the first compressor is achieved by opening the CRV for a duration when powering on the second compressor. By opening the CRV, and allowing air to be drawn to the second compressor from upstream of the first compressor, an amount of suction generated at the outlet of the first compressor by the second compressor may be reduced. As such, by reducing pressure losses at the outlet of the first compressor, an amount of oil leakage across seals of the first compressor may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
in response to a desired engine torque increasing above a threshold:
powering on a second compressor positioned downstream of a first compressor in an intake of an engine system; and
opening a compressor recirculation valve (CRV) positioned in a bypass passage coupled across the first compressor for a duration and routing a portion of intake gasses from upstream of the first compressor to the second compressor.

2. The method of claim 1, wherein the second compressor is an electric compressor and wherein the first compressor is an exhaust-driven turbocharger compressor, wherein the powering on the second compressor occurs concurrently with the opening of the CRV.

3. The method of claim 1, wherein the powering on the second compressor comprises increasing an amount of electrical power provided to the second compressor by an alternator.

4. The method of claim 1, wherein the duration is an amount of time and is determined based on one or more of a speed of the first compressor and a pressure at an outlet of the first compressor.

5. The method of claim 1, further comprising closing the CRV after the duration.

6. The method of claim 1, further comprising maintaining the CRV in an open position until a speed of the first compressor reaches a first threshold speed, and in response to the speed of the first compressor reaching the first threshold speed, closing the CRV, where the first threshold speed corresponds to a speed of the first compressor sufficient to generate a pressure greater than barometric pressure at an outlet of the first compressor, with the second compressor powered on.

7. The method of claim 1, further comprising closing a boost assist valve positioned in a passage coupled across the second compressor in response to the desired engine torque increasing above the threshold.

8. The method of claim 1, further comprising opening a boost assist valve positioned in a passage coupled across the second compressor in response to a pressure in the intake downstream of the second compressor increasing above a desired boost level, the desired boost level corresponding to a pressure of intake gasses in the intake downstream of the second compressor sufficient to deliver the desired engine torque.

9. The method of claim 1, further comprising opening a boost assist valve positioned in a passage coupled across the second compressor in response to a pressure in the intake downstream of the second compressor increasing above a pressure in a volume of the intake included upstream of the second compressor and downstream of the first compressor.

10. The method of claim 1, further comprising opening the CRV in response to a pressure in a volume of the intake included between the first and second compressors decreasing below a threshold.

11. A method comprising:
in response to an increase in desired engine torque, as requested by tip in from a vehicle operator:
opening a compressor bypass valve positioned in a passage coupled across a first compressor;
powering on a second compressor positioned downstream of the first compressor in an intake of an engine system; and
closing the compressor bypass valve in response to a pressure at an outlet of the first compressor increasing above a threshold pressure.

12. The method of claim 11, wherein the closing the compressor bypass valve comprises adjusting the compressor bypass valve to a fully closed position so that substantially no air flows there-through.

13. The method of claim 11, wherein the threshold pressure is approximately the same as a pressure at an inlet of the first compressor.

14. The method of claim 11, wherein the threshold pressure is approximately barometric pressure.

15. The method of claim 11, further comprising closing a valve positioned in a passage coupled across the second compressor in response to the increase in desired engine torque.

16. The method of claim 11, further comprising opening a valve positioned in a passage coupled across the second compressor in response to a difference between a pressure downstream of the second compressor increasing by more than a threshold amount relative to a pressure upstream of the second compressor, the pressure upstream of the second compressor being a pressure of intake gasses included in a volume of the intake between the first and second compressors.

* * * * *